(12) United States Patent
Miller

(10) Patent No.: US 8,055,479 B2
(45) Date of Patent: Nov. 8, 2011

(54) SIMPLIFIED ALGORITHM FOR ABNORMAL SITUATION PREVENTION IN LOAD FOLLOWING APPLICATIONS INCLUDING PLUGGED LINE DIAGNOSTICS IN A DYNAMIC PROCESS

(75) Inventor: John Philip Miller, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 426 days.

(21) Appl. No.: 11/973,960

(22) Filed: Oct. 10, 2007

(65) Prior Publication Data

US 2009/0097537 A1    Apr. 16, 2009

(51) Int. Cl.
*H04B 3/46* (2006.01)
(52) U.S. Cl. ........................................ 702/189
(58) Field of Classification Search .................... 702/189
See application file for complete search history.

(56) References Cited

U.S. PATENT DOCUMENTS

| | | | |
|---|---|---|---|
| 3,096,434 A | 7/1963 | King | |
| 3,404,264 A | 10/1968 | Kugler | |
| 3,701,280 A | 10/1972 | Stroman | |
| 3,705,516 A | 12/1972 | Reis | |
| 3,981,836 A | 9/1976 | Pangle, Jr. et al. | |
| RE29,383 E | 9/1977 | Gallatin et al. | |
| 4,058,275 A | 11/1977 | Banks et al. | |
| 4,099,413 A | 7/1978 | Ohte et al. | |
| 4,322,976 A | 4/1982 | Sisson et al. | |
| 4,337,516 A | 6/1982 | Murphy et al. | |
| 4,408,285 A | 10/1983 | Sisson et al. | |
| 4,425,798 A | 1/1984 | Nagai et al. | |
| 4,435,770 A | 3/1984 | Shiohata et al. | |
| 4,493,042 A | 1/1985 | Shima et al. | |
| 4,517,468 A | 5/1985 | Kemper et al. | |
| 4,527,271 A | 7/1985 | Hallee et al. | |
| 4,530,234 A | 7/1985 | Cullick et al. | |
| 4,607,325 A | 8/1986 | Horn | |
| 4,635,214 A | 1/1987 | Kasai et al. | |
| 4,642,782 A | 2/1987 | Kemper et al. | |
| 4,644,478 A | 2/1987 | Stephens et al. | |
| 4,644,749 A | 2/1987 | Somes | |
| 4,649,515 A | 3/1987 | Thompson et al. | |
| 4,657,179 A | 4/1987 | Aggers et al. | |

(Continued)

FOREIGN PATENT DOCUMENTS

CN      1007757      4/1990

(Continued)

OTHER PUBLICATIONS

International Search Report and Written Opinion for Application No. PCT/US2008/078595, dated Nov. 28, 2008.

(Continued)

*Primary Examiner* — Tung S Lau
(74) *Attorney, Agent, or Firm* — Marshall, Gerstein & Borun LLP

(57) ABSTRACT

Systems and methods are provided for detecting abnormal conditions and preventing abnormal situations from occurring in controlled processes. Statistical signatures of a monitored variable are modeled as a function of the statistical signatures of a load variable. The statistical signatures of the monitored variable may be modeled according to an extensible regression model or a simplified load following algorithm. The systems and methods may be advantageously applied to detect plugged impulse lines in a differential pressure flow measuring device.

17 Claims, 10 Drawing Sheets

U.S. PATENT DOCUMENTS

| | | |
|---|---|---|
| 4,683,542 A | 7/1987 | Taniguti et al. |
| 4,707,796 A | 11/1987 | Calabro et al. |
| 4,734,873 A | 3/1988 | Malloy et al. |
| 4,758,964 A | 7/1988 | Bittner et al. |
| 4,763,243 A | 8/1988 | Barlow et al. |
| 4,764,862 A | 8/1988 | Barlow et al. |
| 4,770,543 A | 9/1988 | Burghoff et al. |
| 4,777,585 A | 10/1988 | Kokawa et al. |
| 4,819,233 A | 4/1989 | Delucia et al. |
| 4,831,564 A | 5/1989 | Suga |
| 4,843,557 A | 6/1989 | Ina et al. |
| 4,853,175 A | 8/1989 | Book, Sr. |
| 4,858,144 A | 8/1989 | Marsaly et al. |
| 4,873,655 A | 10/1989 | Kondraske |
| 4,885,694 A | 12/1989 | Pray et al. |
| 4,885,707 A | 12/1989 | Nichol et al. |
| 4,907,167 A | 3/1990 | Skeirik |
| 4,910,691 A | 3/1990 | Skeirik |
| 4,922,412 A | 5/1990 | Lane et al. |
| 4,924,418 A | 5/1990 | Bachman et al. |
| 4,934,196 A | 6/1990 | Romano |
| 4,942,514 A | 7/1990 | Miyagaki et al. |
| 4,944,035 A | 7/1990 | Roger et al. |
| 4,956,793 A | 9/1990 | Bonne et al. |
| 4,964,125 A | 10/1990 | Kim |
| 4,965,742 A | 10/1990 | Skeirik |
| 4,980,844 A | 12/1990 | Demjanenko et al. |
| 4,992,965 A | 2/1991 | Holter et al. |
| 5,005,142 A | 4/1991 | Lipchak et al. |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,862 A | 8/1991 | Takahashi et al. |
| 5,043,863 A | 8/1991 | Bristol et al. |
| 5,050,095 A | 9/1991 | Samad |
| 5,053,815 A | 10/1991 | Wendell |
| 5,070,458 A | 12/1991 | Gilmore et al. |
| 5,081,598 A | 1/1992 | Bellows et al. |
| 5,089,978 A | 2/1992 | Lipner et al. |
| 5,089,984 A | 2/1992 | Struger et al. |
| 5,094,107 A | 3/1992 | Schoch |
| 5,098,197 A | 3/1992 | Shepard et al. |
| 5,099,436 A | 3/1992 | McCown et al. |
| 5,103,409 A | 4/1992 | Shimizu et al. |
| 5,111,531 A | 5/1992 | Grayson et al. |
| 5,121,467 A | 6/1992 | Skeirik |
| 5,122,976 A | 6/1992 | Bellows et al. |
| 5,130,936 A | 7/1992 | Sheppard et al. |
| 5,134,574 A | 7/1992 | Beaverstock et al. |
| 5,140,530 A | 8/1992 | Guha et al. |
| 5,142,612 A | 8/1992 | Skeirik |
| 5,148,378 A | 9/1992 | Shibayama et al. |
| 5,158,667 A | 10/1992 | Barlow et al. |
| 5,161,013 A | 11/1992 | Rylander et al. |
| 5,167,009 A | 11/1992 | Skeirik |
| 5,175,678 A | 12/1992 | Frerichs et al. |
| 5,187,674 A | 2/1993 | Boone |
| 5,189,232 A | 2/1993 | Shabtai et al. |
| 5,193,143 A | 3/1993 | Kaemmerer et al. |
| 5,197,114 A | 3/1993 | Skeirik |
| 5,197,328 A | 3/1993 | Fitzgerald |
| 5,200,028 A | 4/1993 | Tatsumi et al. |
| 5,200,958 A | 4/1993 | Hamilton et al. |
| 5,210,704 A | 5/1993 | Husseiny |
| 5,212,765 A | 5/1993 | Skeirik |
| 5,214,582 A | 5/1993 | Gray |
| 5,224,203 A | 6/1993 | Skeirik |
| 5,228,780 A | 7/1993 | Shepard et al. |
| 5,235,527 A | 8/1993 | Ogawa et al. |
| 5,251,151 A | 10/1993 | Demjanenko et al. |
| 5,258,113 A | 11/1993 | Edgerton et al. |
| 5,265,031 A | 11/1993 | Malczewski |
| 5,265,222 A | 11/1993 | Nishiya et al. |
| 5,274,572 A | 12/1993 | O'Neill et al. |
| 5,282,131 A | 1/1994 | Rudd et al. |
| 5,282,261 A | 1/1994 | Skeirik |
| 5,291,190 A | 3/1994 | Scarola et al. |
| 5,293,585 A | 3/1994 | Morita et al. |
| 5,301,101 A | 4/1994 | MacArthur et al. |
| 5,303,181 A | 4/1994 | Stockton |
| 5,305,230 A | 4/1994 | Matsumoto et al. |
| 5,311,421 A | 5/1994 | Nomura et al. |
| 5,311,447 A | 5/1994 | Bonne |
| 5,311,562 A | 5/1994 | Palosamy et al. |
| 5,315,521 A | 5/1994 | Hanson et al. |
| 5,317,520 A | 5/1994 | Castle |
| 5,325,522 A | 6/1994 | Vaughn |
| 5,327,357 A | 7/1994 | Feinstein et al. |
| 5,329,443 A | 7/1994 | Bonaquist et al. |
| 5,333,240 A | 7/1994 | Matsumoto et al. |
| 5,333,298 A | 7/1994 | Bland et al. |
| 5,347,449 A | 9/1994 | Meyer et al. |
| 5,349,541 A | 9/1994 | Alexandro, Jr. et al. |
| 5,351,184 A | 9/1994 | Lu et al. |
| 5,353,207 A | 10/1994 | Keeler et al. |
| 5,353,315 A | 10/1994 | Scarola et al. |
| 5,361,612 A | 11/1994 | Voiculescu et al. |
| 5,369,599 A | 11/1994 | Sadjadi et al. |
| 5,373,452 A | 12/1994 | Guha |
| 5,384,698 A | 1/1995 | Jelinek |
| 5,384,699 A | 1/1995 | Levy et al. |
| 5,386,373 A | 1/1995 | Keeler et al. |
| 5,390,287 A | 2/1995 | Obata et al. |
| 5,390,326 A | 2/1995 | Shah |
| 5,394,341 A | 2/1995 | Kepner |
| 5,394,543 A | 2/1995 | Hill et al. |
| 5,396,415 A | 3/1995 | Konar et al. |
| 5,398,303 A | 3/1995 | Tanaka |
| 5,400,246 A | 3/1995 | Wilson et al. |
| 5,404,064 A | 4/1995 | Mermelstein et al. |
| 5,408,406 A | 4/1995 | Mathur et al. |
| 5,408,586 A | 4/1995 | Skeirik |
| 5,414,645 A | 5/1995 | Hirano et al. |
| 5,419,197 A | 5/1995 | Ogi et al. |
| 5,430,642 A | 7/1995 | Nakajima et al. |
| 5,431,460 A | 7/1995 | Hass et al. |
| 5,440,478 A | 8/1995 | Fisher et al. |
| 5,442,544 A | 8/1995 | Jelinek |
| 5,461,570 A | 10/1995 | Wang et al. |
| 5,467,355 A | 11/1995 | Umeda et al. |
| 5,469,735 A | 11/1995 | Watanabe et al. |
| 5,483,387 A | 1/1996 | Bauhahn et al. |
| 5,485,753 A | 1/1996 | Burns et al. |
| 5,486,920 A | 1/1996 | Killpatrick et al. |
| 5,486,996 A | 1/1996 | Samad et al. |
| 5,488,697 A | 1/1996 | Kaemmerer et al. |
| 5,489,831 A | 2/1996 | Harris |
| 5,499,188 A | 3/1996 | Kline, Jr. et al. |
| 5,500,941 A | 3/1996 | Gil et al. |
| 5,504,863 A | 4/1996 | Yoshida et al. |
| 5,511,004 A | 4/1996 | Dubost et al. |
| 5,511,442 A | 4/1996 | Tame |
| 5,519,647 A | 5/1996 | DeVille |
| 5,521,814 A | 5/1996 | Teran et al. |
| 5,521,842 A | 5/1996 | Yamoda |
| 5,528,510 A | 6/1996 | Kraft |
| 5,533,413 A | 7/1996 | Kobayashi et al. |
| 5,537,310 A | 7/1996 | Tanake et al. |
| 5,541,833 A | 7/1996 | Bristol et al. |
| 5,546,301 A | 8/1996 | Agrawal et al. |
| 5,548,528 A | 8/1996 | Keeler et al. |
| 5,552,984 A | 9/1996 | Crandall et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,570,300 A | 10/1996 | Henry et al. |
| 5,572,420 A | 11/1996 | Lu |
| 5,574,638 A | 11/1996 | Lu |
| 5,586,066 A | 12/1996 | White et al. |
| 5,596,704 A | 1/1997 | Geddes et al. |
| 5,598,521 A | 1/1997 | Kilgore et al. |
| 5,600,148 A | 2/1997 | Cole et al. |
| 5,602,757 A | 2/1997 | Haseley et al. |
| 5,602,761 A | 2/1997 | Spoerre et al. |
| 5,604,914 A | 2/1997 | Kabe et al. |

| | | | | | | |
|---|---|---|---|---|---|---|
| 5,606,513 A | 2/1997 | Louwagie et al. | | 5,960,214 A | 9/1999 | Sharpe, Jr. et al. |
| 5,610,339 A | 3/1997 | Haseley et al. | | 5,960,441 A | 9/1999 | Bland et al. |
| 5,623,598 A | 4/1997 | Voigt et al. | | 5,975,737 A | 11/1999 | Crater et al. |
| 5,625,574 A | 4/1997 | Griffiths et al. | | 5,984,502 A | 11/1999 | Calder |
| 5,628,994 A | 5/1997 | Kaper et al. | | 5,988,847 A | 11/1999 | McLaughlin et al. |
| 5,631,825 A | 5/1997 | van Weele et al. | | 5,995,916 A | 11/1999 | Nixon et al. |
| 5,640,491 A | 6/1997 | Bhat et al. | | 5,997,167 A | 12/1999 | Crater et al. |
| 5,640,493 A | 6/1997 | Skeirik | | 6,006,171 A | 12/1999 | Vines et al. |
| 5,646,350 A | 7/1997 | Robinson et al. | | 6,008,985 A | 12/1999 | Lake et al. |
| 5,654,841 A | 8/1997 | Hobson et al. | | 6,014,598 A | 1/2000 | Duyar et al. |
| 5,665,906 A | 9/1997 | Bayer et al. | | 6,014,612 A | 1/2000 | Larson et al. |
| 5,666,297 A | 9/1997 | Britt et al. | | 6,014,876 A | 1/2000 | Taylor |
| 5,671,335 A | 9/1997 | Davis et al. | | 6,017,143 A | 1/2000 | Eryurek et al. |
| 5,671,351 A | 9/1997 | Wild et al. | | 6,026,352 A | 2/2000 | Burns et al. |
| 5,675,504 A | 10/1997 | Serodes et al. | | 6,033,257 A | 3/2000 | Lake et al. |
| 5,680,409 A | 10/1997 | Qin et al. | | 6,035,339 A | 3/2000 | Agraharam et al. |
| 5,682,309 A | 10/1997 | Bartusiak et al. | | 6,038,486 A | 3/2000 | Saitoh et al. |
| 5,687,090 A | 11/1997 | Chen et al. | | 6,041,263 A | 3/2000 | Boston et al. |
| 5,691,895 A | 11/1997 | Kurtzberg et al. | | 6,047,220 A | 4/2000 | Eryurek |
| 5,692,158 A | 11/1997 | Degeneff et al. | | 6,047,221 A | 4/2000 | Piche et al. |
| 5,698,788 A | 12/1997 | Mol et al. | | 6,055,483 A | 4/2000 | Lu |
| 5,704,011 A | 12/1997 | Hansen et al. | | 6,061,603 A | 5/2000 | Papadopoulos et al. |
| 5,715,158 A | 2/1998 | Chen | | 6,067,505 A | 5/2000 | Bonoyer et al. |
| 5,719,767 A | 2/1998 | Jang et al. | | 6,076,124 A | 6/2000 | Korowitz et al. |
| 5,729,661 A | 3/1998 | Keeler et al. | | 6,078,843 A | 6/2000 | Shavit |
| 5,740,324 A | 4/1998 | Mathur et al. | | 6,093,211 A | 7/2000 | Hamielec et al. |
| 5,742,513 A | 4/1998 | Bouhenguel et al. | | 6,106,785 A | 8/2000 | Haviena et al. |
| 5,753,802 A | 5/1998 | Falkler | | 6,108,616 A | 8/2000 | Borchers et al. |
| 5,754,451 A | 5/1998 | Williams | | 6,110,214 A | 8/2000 | Kiimasaukas |
| 5,757,371 A | 5/1998 | Oran et al. | | 6,119,047 A | 9/2000 | Eryurek et al. |
| 5,757,748 A | 5/1998 | Kiyoura et al. | | 6,122,555 A | 9/2000 | Lu |
| 5,761,518 A | 6/1998 | Boehling et al. | | 6,128,279 A | 10/2000 | O'Neil et al. |
| 5,764,891 A | 6/1998 | Warrior | | 6,134,032 A | 10/2000 | Kram et al. |
| 5,768,119 A | 6/1998 | Havekost et al. | | 6,134,574 A | 10/2000 | Oberman et al. |
| 5,777,872 A | 7/1998 | He | | 6,144,952 A | 11/2000 | Keeler et al. |
| 5,781,432 A | 7/1998 | Keeler et al. | | 6,169,980 B1 | 1/2001 | Keeler et al. |
| 5,781,878 A | 7/1998 | Mizoguchi et al. | | 6,185,470 B1 | 2/2001 | Pado et al. |
| 5,790,898 A | 8/1998 | Kishima et al. | | 6,197,480 B1 | 3/2001 | Iguchi et al. |
| 5,796,602 A | 8/1998 | Wellan et al. | | 6,246,950 B1 | 6/2001 | Bessler et al. |
| 5,796,606 A | 8/1998 | Spring et al. | | 6,246,972 B1 | 6/2001 | Klimasauskas |
| 5,796,609 A | 8/1998 | Tao et al. | | 6,259,959 B1 | 7/2001 | Martin |
| 5,798,939 A | 8/1998 | Ochoa et al. | | 6,266,726 B1 | 7/2001 | Nixon et al. |
| 5,803,724 A | 9/1998 | Oortwijn et al. | | 6,298,377 B1 | 10/2001 | Hartikainen et al. |
| 5,805,442 A | 9/1998 | Crater et al. | | 6,298,454 B1 | 10/2001 | Schleiss et al. |
| 5,809,490 A | 9/1998 | Guiver et al. | | 6,317,638 B1 | 11/2001 | Schreder et al. |
| 5,812,394 A | 9/1998 | Lewis et al. | | 6,317,701 B1 | 11/2001 | Pyotsia et al. |
| 5,819,050 A | 10/1998 | Boehling et al. | | 6,332,110 B1 | 12/2001 | Wolfe |
| 5,819,232 A | 10/1998 | Shipman | | 6,387,114 B2 | 5/2002 | Adams |
| 5,825,645 A | 10/1998 | Konar et al. | | 6,389,331 B1 | 5/2002 | Jensen et al. |
| 5,826,249 A | 10/1998 | Skeirik | | 6,391,114 B1 | 5/2002 | Kirimura et al. |
| 5,838,561 A | 11/1998 | Owen et al. | | 6,397,114 B1 | 5/2002 | Eryurek |
| 5,842,189 A | 11/1998 | Keeler et al. | | 6,400,681 B1 | 6/2002 | Bertin et al. |
| 5,847,952 A | 12/1998 | Samad | | 6,418,465 B1 | 7/2002 | Hirosawa et al. |
| 5,848,365 A | 12/1998 | Coverdill | | 6,421,571 B1 | 7/2002 | Spriggs et al. |
| 5,855,791 A | 1/1999 | Hays et al. | | 6,445,963 B1 | 9/2002 | Blevins et al. |
| 5,859,773 A | 1/1999 | Keeler et al. | | 6,507,797 B1 | 1/2003 | Kliman et al. |
| 5,859,885 A | 1/1999 | Rusnica et al. | | 6,529,780 B1 | 3/2003 | Soergel et al. |
| 5,859,964 A | 1/1999 | Wang et al. | | 6,532,392 B1 | 3/2003 | Eryurek et al. |
| 5,875,420 A | 2/1999 | Piety et al. | | 6,535,769 B1 | 3/2003 | Konar |
| 5,877,954 A | 3/1999 | Klimasauskas et al. | | 6,539,267 B1 | 3/2003 | Eryurek et al. |
| 5,880,716 A | 3/1999 | Kunugi et al. | | 6,549,130 B1 | 4/2003 | Joao |
| 5,892,679 A | 4/1999 | He | | 6,567,718 B1 | 5/2003 | Campbell et al. |
| 5,892,939 A | 4/1999 | Call et al. | | 6,571,273 B1 | 5/2003 | Shirai et al. |
| 5,898,869 A | 4/1999 | Anderson | | 6,591,260 B1 | 7/2003 | Schwarzhoff et al. |
| 5,901,058 A | 5/1999 | Steinman et al. | | 6,594,589 B1 | 7/2003 | Coss, Jr. et al. |
| 5,903,455 A | 5/1999 | Sharpe, Jr. et al. | | 6,601,005 B1 | 7/2003 | Eryurek et al. |
| 5,905,989 A | 5/1999 | Biggs | | 6,601,995 B1 | 8/2003 | Harrison et al. |
| 5,907,701 A | 5/1999 | Hanson | | 6,609,036 B1 | 8/2003 | Bickford |
| 5,909,370 A | 6/1999 | Lynch | | 6,609,040 B1 | 8/2003 | Brunnemann et al. |
| 5,909,541 A | 6/1999 | Sampson et al. | | 6,615,090 B1 | 9/2003 | Blevins et al. |
| 5,909,586 A | 6/1999 | Anderson | | 6,628,994 B1 | 9/2003 | Turicchi, Jr. et al. |
| 5,914,875 A | 6/1999 | Monta et al. | | 6,633,782 B1 | 10/2003 | Schleiss et al. |
| 5,918,233 A | 6/1999 | La Chance et al. | | 6,651,012 B1 | 11/2003 | Bechhoefer |
| 5,922,963 A | 7/1999 | Piety et al. | | 6,654,697 B1 | 11/2003 | Eryurek et al. |
| 5,924,086 A | 7/1999 | Mathur et al. | | 6,690,274 B1 | 2/2004 | Bristol |
| 5,940,290 A | 8/1999 | Dixon | | 6,704,689 B1 | 3/2004 | Hogan et al. |
| 5,948,101 A | 9/1999 | David et al. | | 6,717,513 B1 | 4/2004 | Sandelman et al. |
| 5,949,417 A | 9/1999 | Calder | | 6,721,609 B1 | 4/2004 | Wojsznis |
| 5,951,654 A | 9/1999 | Avsan et al. | | 6,732,191 B1 | 5/2004 | Baker et al. |

| | | | | | | |
|---|---|---|---|---|---|---|
| 6,738,388 B1 | 5/2004 | Stevenson et al. | | DE | 102 32 164 | 2/2004 |
| 6,758,168 B2 | 7/2004 | Koskinen et al. | | EP | 0 122 622 | 10/1984 |
| 6,760,782 B1 | 7/2004 | Swales | | EP | 0 362 386 | 4/1990 |
| 6,769,171 B2 | 8/2004 | Jung et al. | | EP | 0 377 736 | 7/1990 |
| 6,774,786 B1 | 8/2004 | Havekost | | EP | 0 413 814 | 2/1991 |
| 6,813,532 B2 | 11/2004 | Eryurek et al. | | EP | 0 487 419 A2 | 5/1992 |
| 6,836,705 B2 | 12/2004 | Hellmann et al. | | EP | 0 581 451 | 2/1994 |
| 6,907,383 B2 | 6/2005 | Eryurek et al. | | EP | 0 594 227 | 4/1994 |
| 6,965,806 B2 | 11/2005 | Eryurek et al. | | EP | 0 612 039 | 8/1994 |
| 7,076,380 B2 | 7/2006 | Michel | | EP | 0 624 847 | 11/1994 |
| 7,079,984 B2 | 7/2006 | Eryurek et al. | | EP | 0 626 697 | 11/1994 |
| 7,085,610 B2 | 8/2006 | Eryurek et al. | | EP | 0 644 470 | 3/1995 |
| 7,233,834 B2 | 6/2007 | McDonald, Jr. et al. | | EP | 0 715 160 | 6/1996 |
| 2002/0022894 A1 | 2/2002 | Eryurek et al. | | EP | 0 827 096 | 3/1998 |
| 2002/0029130 A1 | 3/2002 | Eryurek et al. | | EP | 0 959 398 | 11/1999 |
| 2002/0038156 A1 | 3/2002 | Eryurek et al. | | EP | 0 961 184 | 12/1999 |
| 2002/0067370 A1 | 6/2002 | Forney et al. | | EP | 0 964 325 | 12/1999 |
| 2002/0077711 A1 | 6/2002 | Nixon et al. | | EP | 0 965 897 | 12/1999 |
| 2002/0107858 A1 | 8/2002 | Lundahl et al. | | EP | 1 630 348 | 3/2006 |
| 2002/0133320 A1 | 9/2002 | Wegerich et al. | | EP | 1 669 827 | 6/2006 |
| 2002/0147511 A1 | 10/2002 | Eryurek et al. | | GB | 2 083 258 | 3/1982 |
| 2002/0161940 A1 | 10/2002 | Eryurek et al. | | GB | 2 294 129 | 4/1996 |
| 2002/0163427 A1 | 11/2002 | Eryurek et al. | | GB | 2 294 793 | 5/1996 |
| 2003/0002969 A1 | 1/2003 | Risser | | GB | 2 347 234 | 8/2000 |
| 2003/0009572 A1 | 1/2003 | Thurner | | GB | 2 360 357 A | 9/2001 |
| 2003/0014226 A1 | 1/2003 | Loecher et al. | | GB | 2 379 749 | 3/2003 |
| 2003/0014500 A1 | 1/2003 | Schleiss et al. | | GB | 2 380 833 | 4/2003 |
| 2003/0028268 A1 | 2/2003 | Eryurek et al. | | GB | 2 394 312 A | 4/2004 |
| 2003/0028269 A1 | 2/2003 | Spriggs et al. | | JP | 05-7138472 | 8/1982 |
| 2003/0065409 A1 | 4/2003 | Raeth et al. | | JP | 05-033537 | 2/1993 |
| 2003/0074159 A1 | 4/2003 | Bechhoefer et al. | | JP | 06-242192 | 9/1994 |
| 2003/0121330 A1 | 7/2003 | Muhle et al. | | JP | 06-331507 | 12/1994 |
| 2003/0172002 A1 | 9/2003 | Spira et al. | | JP | 07-127320 | 5/1995 |
| 2003/0195934 A1 | 10/2003 | Peterson et al. | | JP | 07-152714 | 6/1995 |
| 2003/0236579 A1 | 12/2003 | Hauhia et al. | | JP | 07-234988 | 9/1995 |
| 2004/0052526 A1 | 3/2004 | Jones et al. | | JP | 08-261886 | 10/1996 |
| 2004/0064465 A1 | 4/2004 | Yadav et al. | | JP | 10-039728 | 2/1998 |
| 2004/0068392 A1 | 4/2004 | Mylaraswamy | | JP | 10-320039 | 12/1998 |
| 2004/0075689 A1 | 4/2004 | Schleiss et al. | | JP | 11-231924 | 8/1999 |
| 2004/0078171 A1 | 4/2004 | Wegerich et al. | | JP | 2000-305620 | 11/2000 |
| 2004/0095237 A1 | 5/2004 | Chen et al. | | JP | 2001-016662 | 1/2001 |
| 2004/0158772 A1 | 8/2004 | Pan et al. | | WO | WO-98/38585 | 9/1998 |
| 2004/0181364 A1 | 9/2004 | Reeves et al. | | WO | WO-99/13418 | 3/1999 |
| 2004/0249583 A1 | 12/2004 | Eryurek et al. | | WO | WO-00/17721 | 3/2000 |
| 2005/0007249 A1 | 1/2005 | Eryurek et al. | | WO | WO-00/50851 | 8/2000 |
| 2005/0015624 A1 | 1/2005 | Ginter et al. | | WO | WO-00/55700 | 9/2000 |
| 2005/0060103 A1 | 3/2005 | Chamness | | WO | WO-00/62256 | 10/2000 |
| 2005/0143873 A1 | 6/2005 | Wilson | | WO | WO-01/79947 A1 | 10/2001 |
| 2005/0197792 A1 | 9/2005 | Haeuptle | | WO | WO-02/06919 | 1/2002 |
| 2005/0197803 A1 | 9/2005 | Eryurek et al. | | WO | WO-02/23405 | 3/2002 |
| 2005/0197805 A1 | 9/2005 | Eryurek et al. | | WO | WO-02/071168 | 9/2002 |
| 2005/0197806 A1 | 9/2005 | Eryurek et al. | | WO | WO-02/071169 | 9/2002 |
| 2005/0240289 A1 | 10/2005 | Hoyte et al. | | WO | WO-02/071170 | 9/2002 |
| 2005/0251579 A1 | 11/2005 | Ngo et al. | | WO | WO-02/071171 | 9/2002 |
| 2005/0256601 A1 | 11/2005 | Lee et al. | | WO | WO-02/071172 | 9/2002 |
| 2005/0267709 A1 | 12/2005 | Heavner et al. | | WO | WO-02/071173 | 9/2002 |
| 2006/0020423 A1 | 1/2006 | Sharpe, Jr. | | WO | WO-02/095509 | 11/2002 |
| 2006/0047489 A1 | 3/2006 | Scheidt et al. | | WO | WO-02/095510 | 11/2002 |
| 2006/0052991 A1 | 3/2006 | Pflugl et al. | | WO | WO-02/095633 | 11/2002 |
| 2006/0067388 A1 | 3/2006 | Sedarat | | WO | WO-03/019304 | 3/2003 |
| 2006/0074598 A1 | 4/2006 | Emigholz et al. | | WO | WO-03/075206 | 9/2003 |
| 2006/0157029 A1 | 7/2006 | Suzuki et al. | | WO | WO-2005/019948 | 3/2005 |
| 2006/0206288 A1 | 9/2006 | Brahmajosyula et al. | | WO | WO-2005/093531 | 10/2005 |
| 2006/0265625 A1 | 11/2006 | Dubois et al. | | WO | WO-2005/093534 | 10/2005 |
| 2007/0005298 A1 | 1/2007 | Allen et al. | | WO | WO-2005/093535 | 10/2005 |
| 2007/0010900 A1 | 1/2007 | Kavaklioglu et al. | | WO | WO-2006/026340 | 3/2006 |
| 2007/0097873 A1 | 5/2007 | Ma et al. | | WO | WO-2006/107933 | 10/2006 |
| 2007/0109301 A1 | 5/2007 | Smith | | WO | WO-2007/087729 | 8/2007 |
| 2008/0027678 A1 | 1/2008 | Miller | | WO | WO-2008/014349 | 1/2008 |
| 2008/0208527 A1* | 8/2008 | Kavaklioglu ............... 702/179 | | WO | WO-2008/039992 | 4/2008 |
| | | | | WO | WO-2008/085706 | 7/2008 |

FOREIGN PATENT DOCUMENTS

| | | |
|---|---|---|
| CN | 1097804 | 1/1995 |
| CN | 1267373 | 9/2000 |
| DE | 35 40 204 | 9/1986 |
| DE | 40 08 560 | 9/1990 |
| DE | 44 33 593 | 6/1995 |
| DE | 195 02 499 | 8/1996 |
| DE | 101 14 206 A1 | 11/2001 |

OTHER PUBLICATIONS

"Components of GE PREDICTOR™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

"Customer Impact," GE Industrial Systems, available at http://www.geindustrial.com/cwc/services?id=73 on Jul. 18, 2002.

"Electrical Equipment Coverage," GE Industrial Systems, available at http://geindustrial.com/cwc/services?id=72 on Jul. 18, 2002.

"GE PREDICTOR™ Services: GE PREDICTOR Services Overview," GE Industrial Systems, available at http://www.geindustrial.com/cwc/services?id=71 on Jul. 18, 2002.

"Status Signals of Field Instruments," NAMUR Recommendation, NA 64, Feb. 1, 2001, pp. 1-8.

"The HART Protocol—A Solution Enabling Technology," http://www.hartcomm.org 5 pages, (Feb. 2004).

"Time to Tap Into HART," http://www.hartcomm.org 3 pages, (Nov. 2003).

Abnormal Situation Management Consortium www.asmconsortium.com.

Adler, http://www.hartcomm.org, "Continuous HART Communication Increases Safety Integrity Level (SIL)," 3 pages, (Dec. 2000).

Anonymous, "LABVIEW—Digital Filter Design Toolkit User Manual," National Instruments, Retrieved from the Internation on Dec. 8, 2008. URL: http://digital.ni.com/manuals.nsf/websearch/A685C04E4EF714E986256F80007D9C5.

Anonymous, "Signal Processing Blockset User's Guide—Version 6.0.1," Mathworks, Inc., Internet Publication (2004). URL: http://www.mathworks.com.

Chiang et al. "Fault Detection and Diagnosis in Industrial Systems," 35-84 Springer-Verlag London Limited, (2001).

Chiang, et al., "Fault Diagnosis in Chemical Processes Using Fisher Discriminant Analysis, Discriminant Partial Least Squares, and Principal Component Analysis," *Chemometrics and Intelligent Laboratory Systems*, 50: 243-252 (2000).

Defernez et al., "The Use and Misuse of Chemometrics for Treating Classification Problems," *Trends in Analytical Chemistry*, 16(4): 216-221 (1997).

dotnet.za.net, "Web Services—A Guide for Business and IT Managers (Sep. 23, 2001)", (Copyright 2001), www.dotnet.za.net.

Du et al., "Automated Monitoring of Manufacturing Processes, Part 1: Monitoring Methods," *J. Engineering for Industry*, 117:121-132 (1995).

Erguo et al., "An Input-Training Neural Network-Based Nonlinear Principal Component Analysis Approach for Fault Diagnosis," *Proceedings of the 4th World Congress on Intelligent Control and Automation*, pp. 2755-2759 (2002).

Eryurek et al., "Abnormal Situation Prevention Through Smart Field Devices," NPRA 2005 Annual Meeting, Mar. 13-15, San Francisco, CA (2005).

Frank, "Fault Diagnosis in Dynamic Systems Using Analytical and Knowledge-Based Redundancy—A Survey and Some New Results," *Automatica*, 26: 459-474 (1990).

Franklin et al., "Parallel Analysis: A Method for Determining Significant Principal Components." *Journal of Vegetation Science*, 6:99-106 (1995).

Geladi, et al., "Partial Least-Squares Regression: A Tutorial," *Analytica Chimica Acta*, 185: 1-17 (1986).

Hamad et al., "Advances in Abnormal Situation Prevention in Refineries and Petrochemical Plants," AIChE 2006, Spring National Meeting.

Helson, "The Impact of HART on Process Automation, The Compelling Case for the World's Most Used Digital Communication Protocol," www.hartcomm.org (Jun. 2004).

Helson, http://www.hartcomm.org "HART Communication: Driving New Product Developments," 11 pages, (Mar. 2004).

Helson, http://www.hartcomm.org "The Impact of HART on Process Automation," 3 pages, (Jun. 2004).

Helson, http://www.hartcomm.org "Understanding the Power of HART Communication," 3 pages, (Mar. 2003).

Hines et al., "Sensor Validation and Instrument Calibration Monitoring," University of Tennesse Maintenance and Reliability Center (2001).

Horch, "Oscillation Diagnosis in Control Loops—Stiction and Other Causes," Proceedings of the 2006 American Control Conference, Minneapolis, Minnesota, pp. 2086-2096 (2006).

Hoskuldsson, "PLS Regression Methods," *Journal of Chemometrics*, 2: 211-228 (1998).

Internet web page printout of internet access: http://www.hartcomm.org/technical/applications/sasol.html "Sasol Wins 2005 HART Plant of the Year Award," (Nov. 1, 2005).

Isermann, "Fault Diagnosis of Machines via Parameter Estimation and Knowledge Processing—Tutorial paper," *Automatica*, 29: 815-835 (1993).

Kaistha et al., "Incipient Fault Detection and Isolation of Field Devices in Nuclear Power Systems Using Principal Component Analysis," *Nuclear Technology*, 136: 221-230 (2001).

Kalkhoff, "Agent-Oriented Robot Task Transformation," Proceedings of the International Symposium on Intelligent Control, IEEE, pp. 242-247 (Aug. 27, 1995).

Ku et al., "Disturbance Detection and Isolation by Dynamic Principal Component Analysis," *Chemometrics and Intelligent Laboratory Systems*, 30: 179-196 (1995).

Lighthammer Software Development, "Illuminator™ The 1st 'Plant Information Portal'™" (Copyright 1999).

Lin et al., "A Gray System Modeling Approach of the Prediction of Calibration Intervals," *IEEE Transactions on Instrumentation and Measurement*, 54(1): 297-304 (2005).

Matrikon product brochure, "OPC Archiving at MatrikonOPC.com," www.matrikonopc.com/products/opc-drivers/details.asp?driver=1039  http://www.matrikonopc.com/products/opc-drivers/details.asp?driver=1039 , 3 pages (Feb. 2006).

Matrikon product brochure, "OPC Desktop Historian at MatrikonOPC.com," www.matrikonopc.com/products/opc-archiving/opc-desktop-historian.asp  http://www.matrikonopc.com/products/opc-archiving/opc-desktop-historian.asp 4 pages (Feb. 2006).

Mehta et al., "Feedforward Neural Networks for Process Identification and Prediction," presented at ISA 2001, Houston, Texas, Sep. 2001.

Montgomery, "Control Charts as a Tool in SQC (Statistical Quality Control)" Control Charts as a Tool in SQC, available at http://deming.eng.clemson.edu/pub/tutorials/gctools/ccmain1.htm. on May 30, 2006.

Naes et al., "Understanding the Collinearity Problem in Regression and Discriminant Analysis," *J. Chemometrics*, 15:413-426 (2001).

Namur Worksheet, "Status Signals of Field Instruments," NA 64, Feb. 1, 2001, pp. 1-8.

OSIsoft product brochure, "Discover the Power of the PI System," www.osisoft.com/5_267.aspx <http://www.osisoft.com/5_267.aspx, 2 pages (Feb. 2006).

OSIsoft product brochure, "The PI System: A Graphic Overview," 2 pages (2002).

OSIsoft product brochure, "The Power of PI System," 24 pages (2002).

Pettersson, "Execution Monitoring in Robotics: A Survey," *Robotics and Autonomous Systems*, 53:73-88 (2005).

Pratt, http://www.hartcomm.org , "HART Networks," 32 pages, (Apr. 2002).

Pratt, http://www.hartcomm.org , "Sorting Out the Protocols: Network Soup," 17 pages, (Jan. 2002).

Qin et al., "Nonlinear PLS Modeling Using Neural Networks," *Computers Chem. Engng.*, 16(4): 379-391 (1992).

Romeu, "Understanding Binomial Sequential Testing," START: Selected Topics in Assurance Related Technologies, 12(2):1-8 (2005).

Ruel, "Diagnose Loop Behavior to Find and Correct Problems with Final Control Elements, the Environment, and Upstream Systems Before You Tune the Controller," Loop Optimization, available at http://www.expertune.com/artConApr99.html on Jun. 1, 2006.

Russell et al., "Data-Driven Techniques for Fault Detection and Diagnosis in Chemical Processes," 33-80 Springer-Verlag London Limited (2000).

Schwarz et al., "Spectral Envelope Estimation and Representation for Sound Analysis-Synthesis," Spectral Envelope Estimation and Representation, available at http://recherche.ircam.fr/equipes/analyse-synthese/schwarz/publications/icmc1999/se99-poster.html on May 31, 2006.

Systinet, "Introduction to Web Services", (Copyright 2001, 2002), www.systinet.com.

Szanyi et al., "Diagnostics Capabilities of Foundation Fieldbus Pressure Transmitters," *Hydrocarbon Processing*, pp. 53-59 (Apr. 2003).

Timbalia et al., "Fluid Catalytic Cracking Unit Advanced Control in a Distributed Control System," *ISA Transactions*, 30(2):53-61 (1991).

Tzovla et al., "Abnormal Condition Management Using Expert Systems," presented at ISA 2001, Houston, Texas, Sep. 2001.

Wise et al., "The Process Chemometrics Approach to Process Monitoring and Fault Detection," *J. Proc. Cont.*, 6,(6):329-348 (1996).

Yoon et al., "Fault Diagnosis with Multivariate Statistical Models Part I: Using Steady State Fault Signatures," *Journal of Process Control*, 11: 387-400 (2001).

Yoon et al., "Multivariate Process Monitoring and Early Fault Detection (MSPC) Using PCA and PLS," Plant Automation and Decision Support Conference, San Antonio, Texas, pp. 21-24 (Sep. 2003).

Zhao et al., "A Nonlinear Modeling and Online Monitoring Method for the Batch Process Using Multiple Local PCA," *Proceedings of the Second International Conference on Machine Learning and Cybernetics*, pp. 1190-1194 (2003).

Zolera Systems, "A Brief Guide to Web Services Protocols" (Copyright 2001), www.zolera.com.

International Search Report and Written Opinion for Application No. PCT/US2008/072999, dated Dec. 12, 2008.

International Search Report and Written Opinion for Application No. PCT/US2008/074180, dated Oct. 17, 2008.

International Search Report and Written Opinion for Application No. PCT/US2008/078589, dated Feb. 23, 2009.

International Search Report and Written Opinion for Application No. PCT/US2008/078594, dated Jan. 27, 2009.

International Search Report and Written Opinion for Application No. PCT/US2008/078592, dated Dec. 4, 2008.

\* cited by examiner

SIMPLIFIED ALGORITHM FOR ABNORMAL SITUATION PREVENTION IN LOAD FOLLOWING APPLICATIONS INCLUDING PLUGGED LINE DIAGNOSTICS IN A DYNAMIC PROCESS

TECHNICAL FIELD

The present invention relates to systems and methods for detecting abnormal conditions and preventing abnormal situations from occurring in controlled processes. In particular the invention provides for modeling statistical signatures of a monitored variable as a function of the statistical signatures of a load variable. The systems and methods may be advantageously applied to detect plugged impulse lines in a differential pressure flow measuring device.

BACKGROUND OF THE INVENTION

Many field devices and other process related equipment in a process plant include provisions for detecting abnormal situations and preventing them from occurring. Process plant field devices may include devices such as valves, valve positioners, switches, transmitters, and sensors (e.g., temperature, pressure and flow rate sensors). Other process related equipment may include various types of rotating equipment, power generation and distribution equipment, and the like. Each different type of process related equipment having abnormal situation prevention capabilities will likely face different types abnormal situations. Unique algorithms may be developed to detect and prevent the various abnormal situations that may occur for each different type of field device or other process related equipment within a process plant. For example, an abnormal situation prevention algorithm may be implemented to detect plugged impulse lines in differential pressure process flow measuring device.

Many abnormal situation prevention algorithms require monitoring some process variable that changes as a function of one or more other load variables. It is common to use regression analysis to model a monitored variable as a function of a load variable during a learning phase. Once the learning phase is complete the model may be used to predict values of the monitored variable based on measurements of the load variable. The predicted values of the monitored variable may be compared to actual measured values of the monitored variable. An abnormal situation may be detected if the difference between the predicted value of the monitored variable and the measured value of the monitored variable is greater than some predetermined amount. There are many different types of regression models that may be employed in an abnormal situation prevention system. However, one must keep in mind that a regression model developed during a particular learning phase may only be applicable to the particular set of operating conditions present during the learning phase. If one or more operating conditions change during the monitoring phase the regression model may not remain valid. Another problem is that in many applications, the learning phase for training a regression model may be too long relative to the amount of time required for the abnormal situation to develop.

SUMMARY OF THE DISCLOSURE

An embodiment of the invention provides a system for detecting an abnormal condition in a process. According to the system a first input receives sample measurements of at least one process variable. One or more processors are provided to calculate first and second statistical signatures of the sample measurements of the at least one process variable over a plurality of sample windows. The one or more processors are further adapted to generate a function modeling the second statistical signatures as a function of the first statistical signatures. The function modeling the second statistical signatures is defined by an array of data points. Each data point is defined by an ordered pair of corresponding first and second statistical signature values. The one or more processors are adapted to execute either a learning function or a monitoring function depending on the value of the first statistical signature of a new data point. The learning function is executed when the first statistical signature value of the new data point is either less than the first statistical signature value of all of the other data points already stored in the array, or greater than the first statistical signature value of all the points in the array. When the learning function is executed, the new data point is added to the array. The array may be limited to a fixed number of points. In this case, the learning function may include an algorithm for removing an existing point from the array when a new point is to be added. The monitoring function may include calculating a predicted value of the second statistical signature of a new data point based on the function modeling the second statistical signature as a function of the first statistical signature and the first statistical signature value of the new data point. The monitoring function further includes comparing the predicted value of the second statistical signature of the new data point to the actual value of the second statistical signature of the new data point. The monitoring function detects an abnormal condition when the predicted value of the second statistical signature of the new data point and the actual value of the second statistical signature of the new data point differ by more than a predetermined amount.

Another embodiment of the invention provides a method of detecting an abnormal condition in a process. The method includes calculating a plurality of first statistical signature values from samples of a process variable collected over a plurality of sample windows, and calculating a plurality of second statistical signature values from samples of a process variable collected over a plurality of corresponding sample windows. The method further includes generating a function for modeling the second statistical signature values as a function of the first statistical signature values. The model is created by adding points comprising first and second statistical signature values calculated from corresponding sample windows to an array of such points. The method calls for receiving new data points and executing either a learning function or a monitoring function when each new data point is received. Whether the learning function or the monitoring function is executed depends on the value of the first statistical signature of the new data point. The learning function is executed if the value of the first statistical signature of the new data point is less than the first statistical signature value of any data point already stored in the array or if the value of the first statistical signature of the new data point is greater than the first statistical signature value of any data point already stored in the array. Otherwise the monitoring function is executed. The learning function may comprise adding the new point to the array. The array may be limited to a fixed maximum number of points. In this case the learning function may further include removing a point from the array. A point may be removed from the array when a new point to be added to the array will exceed the maximum number of points allowed in the array. The monitoring function may include calculating a predicted value of the second statistical signature of a new data point based on the value of the first statistical signature of the new point and the function modeling the second statistical signature as a function of the first statistical signature. The monitoring function may compare the predicted value of the second statistical signature of the new data point to the actual value of the second statistical signature of the new point. The monitoring function may detect an abnormal condition when the difference between the predicted value and the actual value of the second statistical signature of the new data point exceeds a predefined threshold.

A further embodiment of the invention provides a method of removing a point from a function modeling a second variable as a function of a first variable, where the function comprises an array of data points defined by corresponding values of the first and second variables and linear segments extending between the data points. The method includes determining a point in the array which, if removed from the array and the linear segments of the function defined by the array extending between the point and the two adjacent points replaced with a linear segment extending directly between the two adjacent points results in the smallest amount of error between the original function including the point and the modified function having the point removed. The point that results in the smallest amount of error when the point is removed is the point that is removed from the array.

Still another embodiment of the invention provides a system for detecting a plugged impulse line in a process flow measuring device. The system includes a sensor for detecting a differential pressure across a primary element in a process flow line. The sensor provides a pressure signal representative of the differential pressure across the primary element. A filter is provided for removing unwanted frequency components from the differential pressure signal. One or more processors are provided. The one or more processors implement a first statistical process monitoring (SPM) block, a second SPM block, and a plugged line diagnostic block. The first SPM block is configured to calculate mean values from a plurality of pressure signal samples collected during predefined sample windows. The second SPM block is configured to calculate standard deviation values from a plurality of filtered pressure signal samples collected during the predefined sample windows. The plugged line diagnostic block is configured to model the standard deviation values as a function of corresponding mean values and predict standard deviation values based on the mean values. The plugged line diagnostic block further compares the predicted standard deviation values to corresponding standard deviation values calculated from the pressure signal samples. A plugged impulse line is detected when a predicted standard deviation value differs from a corresponding calculated standard deviation value by more than a predefined amount. The diagnostic block may comprise an extensible regression model or a simplified load following algorithm.

Finally, an embodiment of the invention may provide a method of detecting a plugged impulse line in a process flow measuring device. The method includes detecting a differential pressure across a primary element in a process flow line. A pressure signal representing the differential pressure across the primary element is generated. The method calls for filtering the pressure signal to generate a filtered pressure signal. Next the method calls for calculating mean values of pressure signal samples and standard deviation values of filtered pressure signal samples collected over predefined sample windows. The method next calls for modeling standard deviation values of the filtered pressure signal as a function of mean values of the pressure signal. The model is used for predicting standard deviation values of the filtered pressure signal based on mean values of the pressure signal. The predicted standard deviation values of the filtered pressure signal are compared to calculated standard deviation values of the filtered pressure signal. The method calls for detecting a plugged impulse line when a predicted standard deviation value of the filtered pressure signal differs from a corresponding calculated value of the standard deviation of the filtered pressure signal by more than a predefined amount.

Further aspects and advantages will be apparent to those of ordinary skill in the art from a review of the following detailed description, taken in conjunction with the drawings. While the compositions and methods are susceptible of embodiments in various forms, the description hereafter includes specific embodiments with the understanding that the disclosure is illustrative, and is not intended to limit the invention to the specific embodiments described herein.

DETAILED DESCRIPTION

Figure 1:
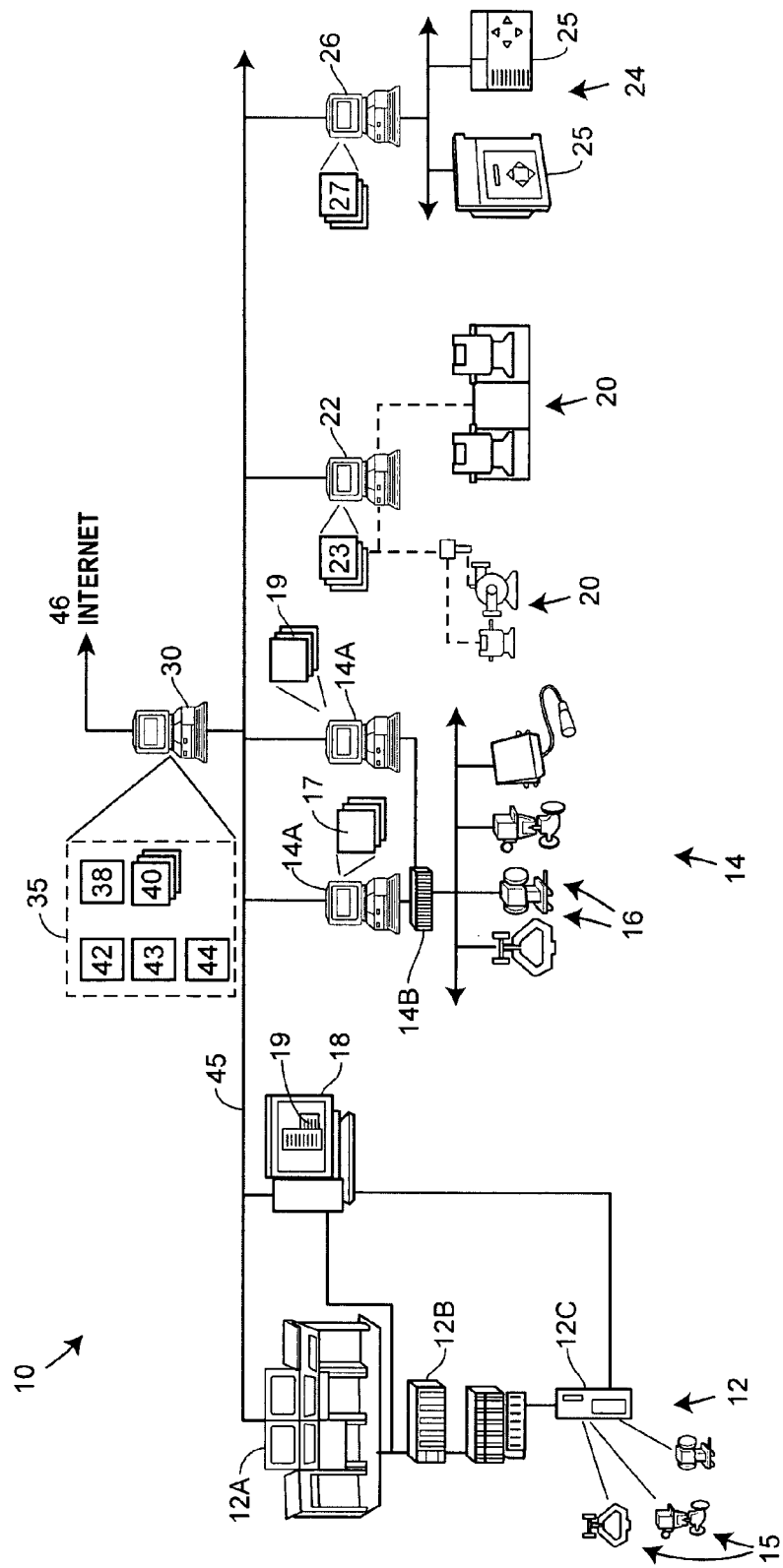
FIG. 1 is an exemplary block diagram of a process plant having a distributed control and maintenance network including one or more operator and maintenance workstations, controllers, field devices and supporting equipment, in which an abnormal situation prevention system may be implemented.

Referring now to FIG. 1, an exemplary process plant 10 in which an abnormal situation prevention system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PRO-VOX or RS3 system or any other control system which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools 17, 19 available to the process control operator for controlling the operation of the process including, for example, control optimizers, diagnostic experts, neural networks, tuners, etc.

Still further, maintenance systems, such as computers executing the Asset Management Solutions (AMS™) Suite: Intelligent Device Manager application and/or the monitoring, diagnostics and communication applications described below may be connected to the process control systems 12 and 14 or to the individual devices therein to perform maintenance, monitoring, and diagnostics activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS™ application may be installed in and executed by one or more of the user interfaces 14A associated with the distributed process control system 14 to perform maintenance and monitoring functions, including data collection related to the operating status of the devices 16.

The process plant 10 also includes various rotating (and other) equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute any number of monitoring and diagnostic applications 23, including commercially available applications, such as those provided by CSI (an Emerson Process Management Company), as well the applications, modules, and tools described below, to diagnose, monitor and optimize the operating state of the rotating equipment 20 and other equipment in the plant. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration application 38 and, optionally, an abnormal operation detection system 42. Additionally, the computer system 30 may implement an alert/alarm application 43.

Generally speaking, the abnormal situation prevention system 35 may communicate with (or include) abnormal operation detection systems, modules or tools (not shown in FIG. 1) optionally located in the field devices 15, 16, the controllers 12B, 14B, the rotating equipment 20, the support computer 22, the power generation equipment 25 or support computer 26, or any other desired devices and equipment within the process plant 10. The abnormal situation prevention system 35 may also interact with the abnormal operation detection system 42 in the computer system 30, to configure each of these abnormal operation detection systems and to receive information regarding the operation of the devices or subsystems that they are monitoring. The abnormal situation prevention system 35 may be communicatively connected via a hardwired bus 45 to each or at least some of the computers or devices within the plant 10, or, alternatively may be connected via any other desired communication connection including, for example, wireless connections, dedicated connections which use OPC (or OLE for process control), intermittent connections, such as ones which rely on handheld devices to collect data, etc. Likewise, the abnormal situation prevention system 35 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the abnormal situation prevention system 35 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the abnormal situation prevention system 35 to computers/devices in the plant 10 are described herein, one of ordinary skill in the art will recognize that a variety of other methods of coupling the abnormal situation prevention system 35 to computers/devices in the plant 10 can be used as well.

By way of background, OPC is a standard that establishes a mechanism for accessing process data from the plant or process control system. Typically, an OPC server is implemented in a process control system to expose or provide process information from, for example, field devices. An OPC client creates a connection to an OPC server and writes or reads process information to or from a field device. OPC servers use OLE technology (i.e., Component Object Model or COM) to communicate with such clients so that the software applications implemented by the clients can access data from the field devices or other process plant equipment.

Figure 2:
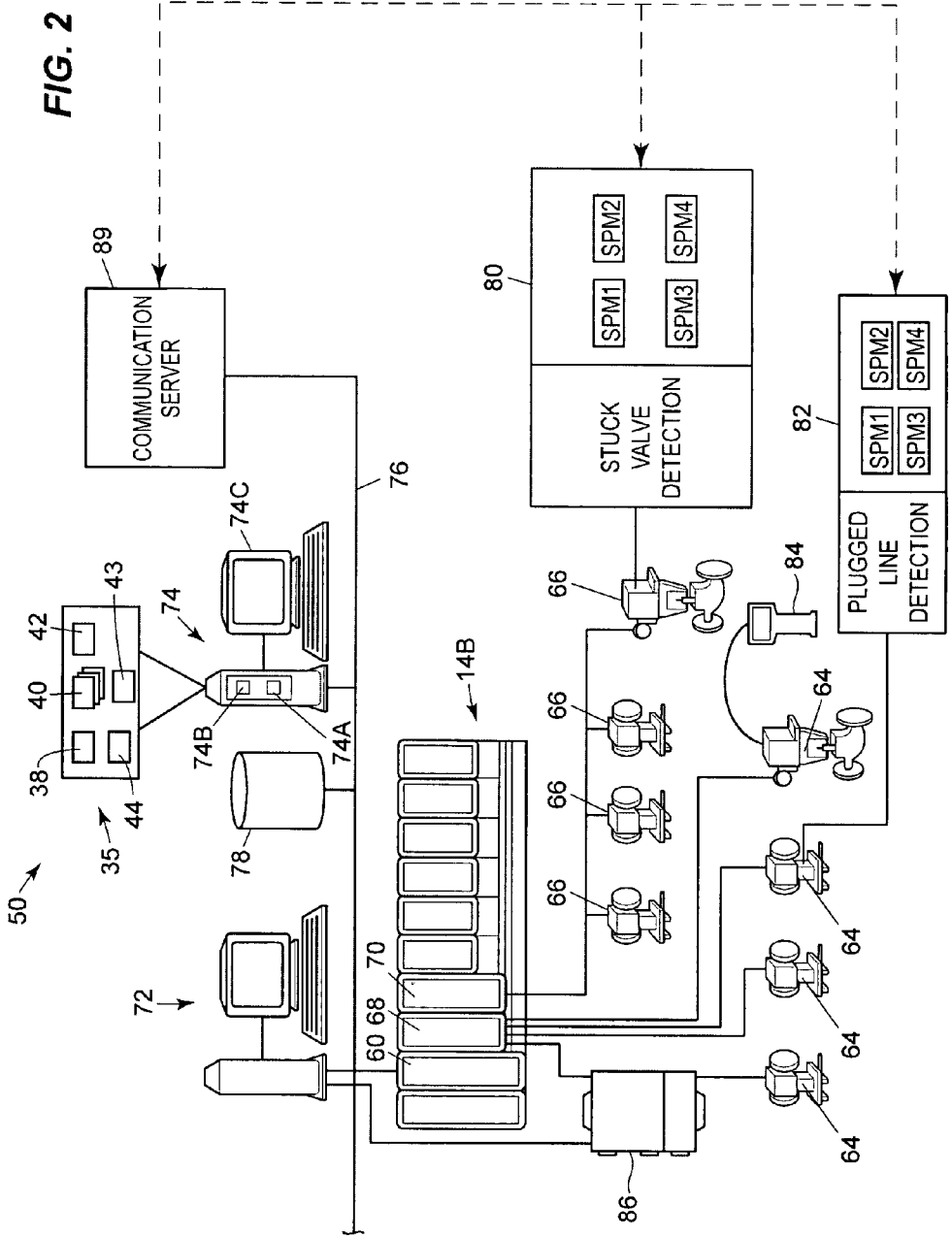
FIG. 2 is an exemplary block diagram of a portion of the process plant of FIG. 1 illustrating communication interconnections between various components of an abnormal situation prevention system located within different elements of the process plant.

FIG. 2 illustrates a portion 50 of the example process plant 10 of FIG. 1 for the purpose of describing one manner in which the abnormal situation prevention system 35 and/or the alert/alarm application 43 may communicate with various devices in the portion 50 of the example process plant 10. While FIG. 2 illustrates communications between the abnormal situation prevention system 35 and one or more abnormal operation detection systems within HART and Fieldbus field devices, it will be understood that similar communications can occur between the abnormal situation prevention system 35 and other devices and equipment within the process plant 10, including any of the devices and equipment illustrated in FIG. 1.

The portion 50 of the process plant 10 illustrated in FIG. 2 includes a distributed process control system 14B having one or more process controllers 60 connected to one or more field devices 64 and 66 via input/output (I/O) cards or devices 68 and 70, which may be any desired types of I/O devices conforming to any desired communication or controller protocol. The field devices 64 are illustrated as HART field devices and the field devices 66 are illustrated as Fieldbus field devices, although these field devices could use any other desired communication protocols. Additionally, each of the field devices 64 and 66 may be any type of device such as, for example, a sensor, a valve, a transmitter, a positioner, etc., and may conform to any desired open, proprietary or other communication or programming protocol, it being understood that the I/O devices 68 and 70 must be compatible with the desired protocol used by the field devices 64 and 66.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and field devices 64 and 66 within the process plant 10. Thus, the database 78 may operate as a configuration database to store the current configuration, including process configuration modules, as well as control configuration information for the process control system 14B as downloaded to and stored within the process controllers 60 and the field devices 64 and 66. Likewise, the database 78 may store historical abnormal situation prevention data, including statistical data collected by the field devices 64 and 66 within the process plant 10, statistical data determined from process variables collected by the field devices 64 and 66, and other types of data that will be described below.

While the process controllers 60, I/O devices 68 and 70, and field devices 64 and 66 are typically located down within and distributed throughout the sometimes harsh plant environment, the workstations 72 and 74, and the database 78 are usually located in control rooms, maintenance rooms or other less harsh environments easily accessible by operators, maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 2, the maintenance workstation 74 includes a processor 74A, a memory 74B and a display device 74C. The memory 74B stores the abnormal situation prevention application 35 and the alert/alarm application 43 discussed with respect to FIG. 1 in a manner that these applications can be implemented on the processor 74A to provide information to a user via the display 74C (or any other display device, such as a printer).

Each of one or more of the field devices 64 and 66 may include a memory (not shown) for storing routines such as routines for implementing statistical data collection pertaining to one or more process variables sensed by sensing device and/or routines for abnormal operation detection, which will be described below. Each of one or more of the field devices 64 and 66 may also include a processor (not shown) that executes routines such as routines for implementing statistical data collection and/or routines for abnormal operation detection. Statistical data collection and/or abnormal operation detection need not be implemented by software. Rather, one of ordinary skill in the art will recognize that such systems may be implemented by any combination of software, firmware, and/or hardware within one or more field devices and/or other devices.

As shown in FIG. 2, some (and potentially all) of the field devices 64 and 66 include abnormal operation detection blocks 80 and 82, which will be described in more detail below. While the blocks 80 and 82 of FIG. 2 are illustrated as being located in one of the devices 64 and in one of the devices 66, these or similar blocks could be located in any number of the field devices 64 and 66, could be located in other devices, such as the controller 60, the I/O devices 68, 70 or any of the devices illustrated in FIG. 1. Additionally, the blocks 80 and 82 could be in any subset of the devices 64 and 66. Alternatively, the blocks 80 and 82 could be located in a hand-held communicator 84 such as the 375 Field Communicator offered by Emerson Process Management, or a field device interface module 86 such as the Rosemount 3420, also offered by Emerson Process Management.

Generally speaking, the blocks 80 and 82 or sub-elements of these blocks, collect data, such as process variable data, from the device in which they are located and/or from other devices. Additionally, the blocks 80 and 82 or sub-elements of these blocks may process the variable data and perform an analysis on the data for any number of reasons. For example, the block 80, which is illustrated as being associated with a valve, may have a stuck valve detection routine which analyzes the valve process variable data to determine if the valve is in a stuck condition. In addition, the block 80 may include a set of one or more statistical process monitoring (SPM) blocks or units such as blocks SPM1-SPM4 which may collect process variable or other data within the field device and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. Neither the specific statistical data generated, nor the method in which it is generated, is critical. Thus, different types of statistical data can be generated in addition to, or instead of, the specific types described above. Additionally, a variety of techniques, including known techniques, can be used to generate such data. The term statistical process monitoring (SPM) block is used herein to describe functionality that performs statistical process monitoring on at least one process variable or other process parameter, and may be performed by any desired software, firmware or hardware within the device or even outside of a device for which data is collected. It will be understood that, because the SPMs are generally located in the devices where the device data is collected, the SPMs can acquire quantitatively more and qualitatively more accurate process variable data. As a result, the SPM blocks are generally capable of determining better statistical calculations with respect to the collected process variable data than a block located outside of the device in which the process variable data is collected.

Although the blocks 80 and 82 are shown to include SPM blocks in FIG. 2, the SPM blocks may instead be stand-alone blocks separate from the blocks 80 and 82, and may be located in the same device as the corresponding block 80 or 82 or may be in a different device. The SPM blocks discussed herein may comprise known Foundation Fieldbus SPM blocks, or SPM blocks that have different or additional capabilities as compared with known Foundation Fieldbus SPM blocks. The term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the Foundation Fieldbus protocol, or some other protocol, such as Profibus, HART, CAN, etc. protocol. If desired, the underlying operation of blocks 80, 82 may be performed or implemented at least partially as described in U.S. Pat. No. 6,017,143, which is hereby incorporated by reference herein.

It is to be understood that although the blocks 80 and 82 are shown to include SPM blocks in FIG. 2, SPM blocks are not required of the blocks 80 and 82. For example, abnormal operation detection routines of the blocks 80 and 82 could operate using process variable data not processed by an SPM block. As another example, the blocks 80 and 82 could each receive and operate on data provided by one or more SPM blocks located in other devices. As yet another example, the process variable data could be processed in a manner that is not provided by many typical SPM blocks. As just one example, the process variable data could be filtered by a finite impulse response (FIR) or infinite impulse response (IIR) filter such as a bandpass filter or some other type of filter. As another example, the process variable data could be trimmed so that it remained in a particular range. Of course, known SPM blocks could be modified to provide such different or additional processing capabilities.

The block 82 of FIG. 2, which is illustrated as being associated with a transmitter, may have a plugged line detection unit that analyzes the process variable data collected by the transmitter to determine if a line within the plant is plugged. In addition, the block 82 may include one or more SPM blocks or units such as blocks SPM1-SPM4 which may collect process variable or other data within the transmitter and perform one or more statistical calculations on the collected data to determine, for example, a mean, a median, a standard deviation, etc. of the collected data. While the blocks 80 and 82 are illustrated as including four SPM blocks each, the blocks 80 and 82 could have any other number of SPM blocks therein for collecting and determining statistical data.

Further details regarding the implementation and configuration of abnormal situation prevention systems and components thereof can be found in U.S. Pat. Publ. No. 2005/0197803, now U.S. Pat. No. 7,079,984 ("Abnormal situation prevention in a process plant"), U.S. Pat. Publ. No. 2005/0197806 ("Configuration system and method for abnormal situation prevention in a process plant"), and U.S. Pat. Publ. No. 2005/0197805 ("Data presentation system for abnormal situation prevention in the process plant"), each of which is hereby incorporated by reference for all purposes.

In the abnormal situation prevention systems and techniques described above and in the referenced documents, the SPM (or abnormal situation prevention) blocks 80, 82 may be associated with, or considered components of, one or more abnormal situation prevention modules. While abnormal situation prevention blocks may reside in a field device, where the faster-sampled data is available, abnormal situation prevention modules may reside in a host system or controller. The abnormal situation prevention modules may take data from one or more abnormal situation prevention blocks, and use the data to make a decision about the larger system. More generally, an abnormal situation prevention module may be developed and configured to receive data from one or more function blocks (e.g., abnormal situation prevention blocks) to support diagnostics for each type of field device, instrumentation or other equipment (e.g., valve, pump, etc.). Nonetheless, the function blocks associated with an abnormal situation prevention module may reside and be implemented by devices other than the specific equipment for which it was developed. In such cases, the abnormal situation prevention module has a distributed nature. Other abnormal situation prevention modules may be implemented entirely within one device, such as the process controller 60, despite being directed to diagnostics for a specific field device. In any event, a diagnostics routine or technique may be developed for each equipment type for detecting, predicting and preventing abnormal situations or operation of the equipment (or process). For ease in description only, the term "abnormal situation prevention module" will be used herein to refer to such routines or techniques. An abnormal situation prevention module is therefore responsive to a set of measurements needed to perform the diagnostics, and further includes (i) a set of abnormal conditions to be detected by the module, and (ii) a set of rules, which link a change in the measurements to a corresponding abnormal condition. Furthermore, references to abnormal situation prevention modules in the description of the disclosed techniques to follow are set forth with the understanding that the techniques may be utilized in conjunction with abnormal situation prevention blocks as well.

In some cases, the configuration application 38 or other component of the abnormal situation prevention system 35 may support the development or generation of a template for each abnormal situation prevention module. For example, the configuration and development platform provided by the DeltaV™ control system may be used to create specific instances, or instantiations, of abnormal situation prevention modules from corresponding composite template blocks.

Although shown and described in connection with FIG. 2 as abnormal situation prevention functionality, the modules and blocks described above may be more generally directed to implementing multivariate statistical techniques configured for process monitoring and diagnostics and fault detection. In some cases, the techniques described below may include or be integrated with abnormal situation prevention modules or blocks. In any case, references below to systems and techniques (and any modules, function blocks, applications, software or other components or aspects thereof) may utilize, include, be integrated with, or otherwise be associated with the workstation tools 17, 19, operator interfaces 12A, 14A, applications 23, abnormal situation prevention system 25 and interfaces 72, 74 described above.

Many types of field devices and other equipment include abnormal situation prevention algorithms that involve monitoring a process variable that changes as a function of a process load variable. Many such algorithms employ some type of regression analysis to model the behavior of the monitored variable as a function of the load variable. In such cases, a number of data points comprising corresponding values of both the monitored variable and the load variable are recorded during a learning phase. A regression model is calculated from the data points recorded during the learning phase. Then the regression model may be used to predict values of the monitored variable based on measured values of the load variable during a monitoring phase. The abnormal situation prevention algorithm may compare predicted monitored variable values to actual measured values of the monitored variable. An abnormal situation may be detected when the measured value of the monitored variable differs from the predicted value by a significant amount.

An extensible regression algorithm with applications to statistical process monitoring is disclosed in U.S. patent application Ser. No. 11/492,467, filed Jul. 25, 2006 entitled Method and System For Detecting Abnormal Operation In A Process Plant, the entire disclosure of which is incorporated herein by reference. Two significant features of the extensible regression algorithm disclosed in the above identified patent application include the ability to extend the regression model beyond the range of load variable values in the original model, and employing statistical signatures (derived from SPM blocks) as inputs to the regression algorithm.

Figure 3:
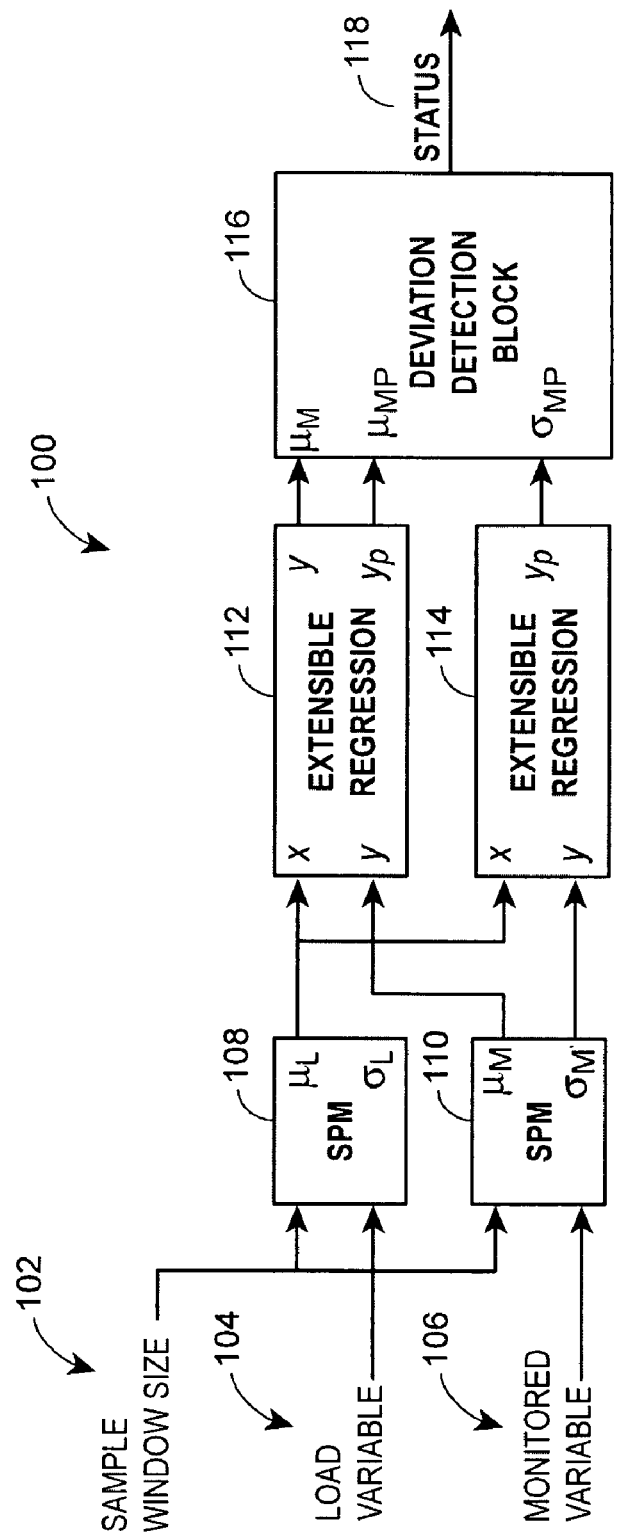
FIG. 3 is a block diagram of an abnormal situation prevention system employing an extensible regression algorithm.

FIG. 3 is a block diagram 100 of an abnormal situation prevention system employing the extensible regression algorithm disclosed in U.S. patent application Ser. No. 11/492, 467. The abnormal situation prevention system 100 includes first and second SPM blocks 108, 110, first and second extensible regression blocks 112, 114, and a deviation detection block 116. A sample window size 102 is input to both the first SPM block 108 and the second SPM block 110. The sample window size 102 defines the number of samples to be used in calculating the various statistical signatures calculated by the first and second SPM blocks 108, 110. Load variable data 104 are input to the first SPM block 108. Monitored variable data 106 are input to the second SPM block 110. The first SPM block 108 calculates the mean $\mu_L$ of the load variable values in each sample window. The second SPM block 110 calculates the mean μM and the standard deviation $\sigma_M$ of the monitored variable values in each sample window. The mean values of the load variable $\mu_L$ calculated by the first SPM block 108 are input to both the first extensible regression block 112 and the second extensible regression block 114. The mean values of the monitored variable $\sigma_M$ calculated by the second SPM block 110 are input as the dependent variable y to the first extensible regression block 112, and the standard deviation values of the monitored variable $\sigma_M$ calculated by the second SPM block 110 are input as the dependent variable y to the second extensible regression block 114.

During a learning phase, the extensible regression blocks 112, 114 receive multiple (x, y) data sets comprising corresponding values of the independent variable x and dependent variable y. In the case of the first extensible regression block 112, the independent variable x corresponds to load variable mean values $\mu_L$ calculated by the first SPM block 108, and the dependent variable y corresponds to the monitored variable mean $\mu_M$ values calculated by the second SPM block 110. In the case of the second extensible regression block 114, the independent variable x again corresponds to load variable mean values $\mu_L$ calculated by the first SPM block 108 and the dependent variable y corresponds to the monitored variable standard deviation values $\sigma_M$ calculated by the second SPM block 110. The extensible regression blocks 112, 114 generate functions modeling the behavior of the dependent variable as a function of the independent variable based on the data sets received during the learning phase. Thus, the first extensible regression block 112 models the behavior of the mean $\mu_M$ of the monitored variable as a function of the mean $\mu_L$ of the load variable, based on the mean values $\mu_L$ and $\sigma_M$ received during the learning phase. Likewise, the second extensible regression block 114 models the behavior of the standard deviation $\sigma_M$ of the monitored variable as a function of the mean $\mu_L$ of the load variable based on the mean values $\mu_L$ and standard deviation values $\sigma_M$ received during the learning phase.

During a monitoring phase, the models created by the first and second extensible regression blocks 112, 114 are used to generate predicted values $y_p$ of the dependent variable based on received values of the independent variable. Thus, in the case of the first extensible regression block 112, where the independent variable x comprises the load variable mean values $\mu_L$ and the dependent variable y comprises the monitored variable mean values $\sigma_M$, the first regression block 112 generates predicted values $y_p$ of the monitored variable mean $\mu_{MP}$ based on received values of the load variable mean $\mu_L$. The second extensible regression model 114, where the independent variable x again comprises the load variable mean values μL and the dependent variable y comprises the monitored variable standard deviation values $\sigma_M$, generates predicted values $y_p$ of the monitored variable standard deviation $\sigma_{MP}$ based on received load variable mean values $\mu_L$. The first extensible regression block 112 outputs the dependent variable y (i.e., the monitored variable mean $\mu_M$ values calculated by the second SPM block 110) and the predicted values of the dependent variable $y_p$ (i.e., the predicted values of the monitored variable $\mu_M$). The second extensible regression model 114 outputs the predicted values of the dependent variable $y_p$ (i.e., the predicted standard deviation values $\sigma_{MP}$ of the monitored variable calculated by the second SPM block 110). The actual values of the monitored variable mean $\mu_M$, the predicted values of the monitored variable mean $\mu_{MP}$, and the predicted values of the monitored variable standard deviation $\sigma_{MP}$ are input to the deviation detection block 116.

The deviation detection block 116 is configured to detect the occurrence of an abnormal situation based on the input values of the monitored variable mean $\mu_M$, the predicted value of the monitored variable mean $\mu_{MP}$ and the predicted value of the monitored variable standard deviation $\sigma_{MP}$. The deviation detection block 116 generally compares the mean $\mu_M$ of the monitored variable to the predicted mean $\mu_{MP}$ of the monitored variable. Additionally, the deviation detector 116 utilizes the result of this comparison along with the predicted standard deviation $\sigma_{MP}$ of the monitored variable to determine if a significant deviation has occurred. More specifically, the deviation detector 116 generates a status signal 118 as follows:

if $\mu_M > (\mu_{MP} + m\sigma_{MP})$, then a status signal indicating that the mean $\mu_M$ appears to be too high ("UP") is generated;

if $\mu_M < (\mu_{MP} - m\sigma_{MP})$, then a status signal indicating that the mean $\mu_M$ appears to be too low ("DOWN") is generated;

otherwise, a status signal indicating that the mean $\mu_M$ appears to be in a normal range ("NO CHANGE") is generated;

where m is a real number that may be fixed or may be modifiable by a user. As a default, m could be set to 3, for example. Of course, any other suitable default value could be used. The value of m could be configured using the configuration application 38 (shown in FIGS. 1 and 2), for example. In some implementations, the status signal may be in the form of an alert or alarm.

The algorithm 100 depicted in FIG. 3 is well suited for situations in which an abnormal condition builds up slowly over time. For example, in a coker fired heater a high coking condition occurs gradually over the course of days. Measurement values that may be used to detect the high coking condition may be available for example, every 1 to 10 seconds. In this case, a sample window of 5 minutes may contain 30-300 samples from which to calculate the appropriate statistical signatures, such as the load variable mean $\mu_L$, the monitored variable mean $\mu_M$, or the monitored variable standard deviation $\sigma_M$. With a sample window of 5 minutes it would take six hours to calculate a regression curve based on just 72 mean values (72 samples×5 minutes/sample×1 hr/60 minutes=6 hr). A six-hour training period for developing the regression model is not a problem when the abnormal situation takes much longer than six hours to develop. In other circumstances, however, an abnormal situation may develop in a much shorter time frame. In these situations a six-hour or other comparably long training period may be entirely unsuitable.

Figure 4:
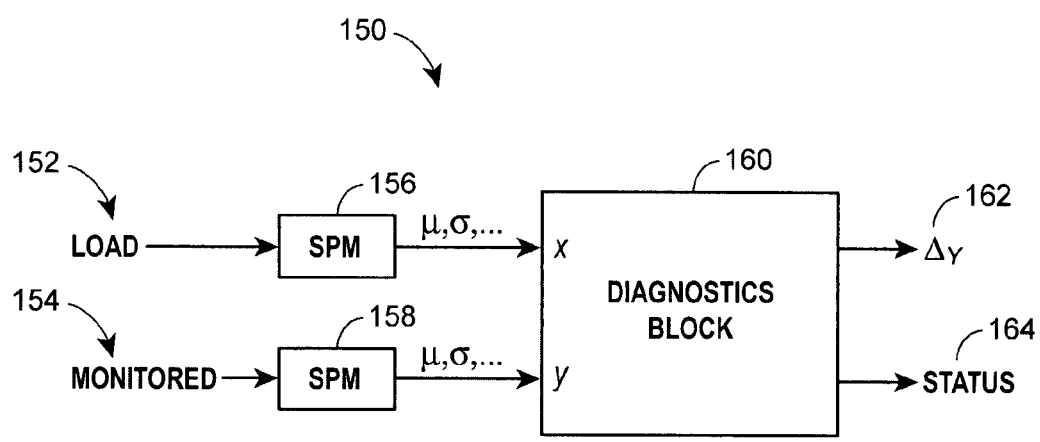
FIG. 4 is a block diagram of an abnormal situation prevention system employing a load following algorithm.

An alternative abnormal situation prevention system 150 having a much shorter training period is shown in FIG. 4. According to the abnormal situation prevention system 150 a load variable 152 is input to a first SPM block 156. The first SPM block 156 calculates the mean $\mu_L$, the standard deviation $\sigma_L$, or some other statistical signature of the load variable values received over a specified sample window. A monitored variable 154 is input to a second SPM block 158. The second SPM block 158 calculates the mean $\mu_M$, the standard deviation $\sigma_M$, or some other statistical signature of the monitored variable values received over the specified sample window. The statistical signature values output from the first SPM block 156 are input to a diagnostic block 160 as the independent variable x. The statistical signature values output from the second SPM block 158 are input to the diagnostic block 160 as the dependent variable y. The diagnostic block 160 calculates the difference $\Delta y$ 162 between an actual measured value of the dependent variable y and a predicted value of the dependent variable $y_p$. The diagnostic block 160 further determines whether an abnormal situation exists and generates an appropriate status signal 164 that may be transmitted to a controller or other process control device.

Figure 5:
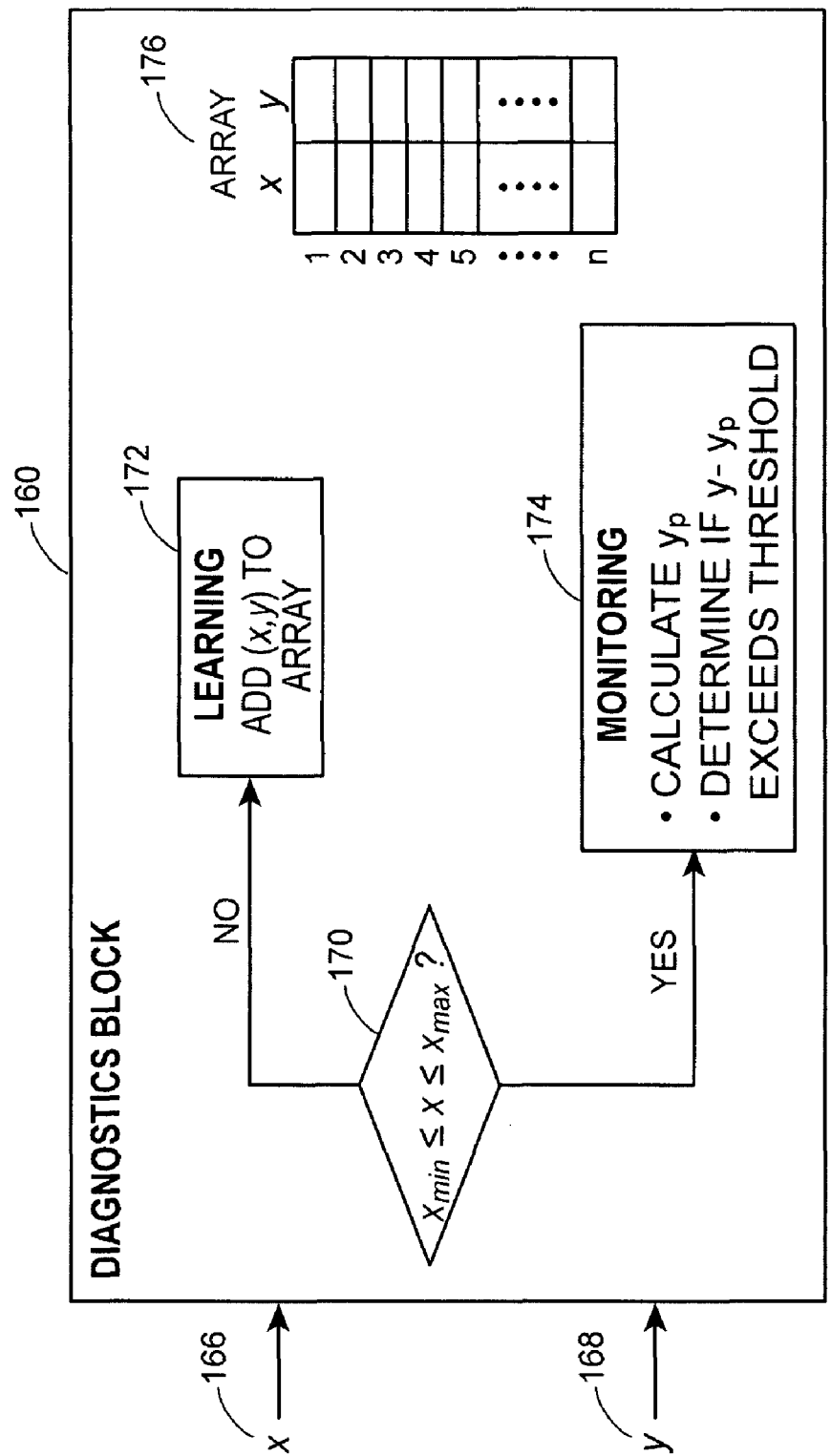
FIG. 5 is a detailed block diagram of the diagnostic block shown in FIG. 4.
Figure 6:
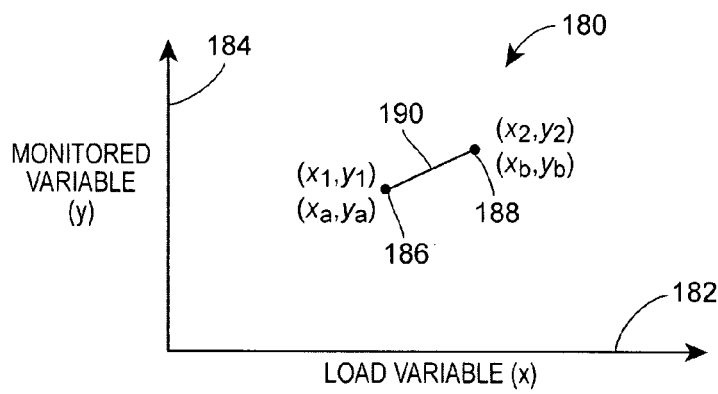
FIG. 6 is a table showing an array of data points and a corresponding plot of a function defined by the data points in the array when the array includes two data points.

A detailed block diagram of the diagnostic block 160 is shown in FIG. 5. The output of the first SPM block 156 is input to the diagnostic block 160 as the independent variable x 166, and the output of the second SPM block 158 is input to the diagnostic block 160 as the dependent variable y 168. The SPM blocks 156, 158 operate on common sample widows so that corresponding (x, y) values are received by the diagnostic block 160 at substantially the same time. The diagnostic block 160 implements a learning function 172 and a monitoring function 174. The diagnostic block 160 also maintains an array of selected (x, y) data points 176. When a new set of (x, y) values is received from the SPM blocks 156, 158, a determination is made in decision block 170 whether to implement the learning function 172 or the monitoring function 174. At decision block 170 the value of the independent variable x of the new data set is compared to the values of the independent variable x of the data stored in the array 176. If the value of the independent variable x in the new (x, y) data set is outside the range of independent variable values that have already been received and stored in the array, in other words, if $x<x_{min}$ or $x>x_{max}$, where $x_{min}$ is the smallest value of the independent variable x stored in the array 176 and $x_{max}$ is the highest value of the independent variable x stored in the array 176, then the learning function 172 is executed. If the value of the independent variable x in a new (x, y) data set is within the range of independent variable x values that have already been received and stored in the array, in other words if $x_{min} \leq x \leq x_{max}$, then the monitoring function 174 is executed. When the learning function 172 is executed, the new (x, y) data set is added to the array 176. If $x<x_{min}$ the new data set is added to the top or front of the array 176 and the index values of the existing data sets stored in the array 176 are incremented by 1. If $x>x_{max}$ the new data set is added to the bottom or back of the array 176 and the index values of the existing data sets are left unchanged.

The array 176 defines a function that models the dependent variable y as a function of received values of the independent variable x. The function defined by the array may comprise a plurality of linear segments extending between data points defined by the (x, y) data sets stored in the array 176. For a given value of x, a corresponding value of y may be predicted using the function as follows. If the received value of x equals one of the values $x_i$ stored in the array 176, then the predicted value of the dependent variable $y_p$ is simply equal to the corresponding value $y_i$ stored in the array 176. However, if the value of the independent variable x does not exactly match one of the values $x_i$ stored in the array 176, the predicted value of the dependent $y_p$ may be calculated by performing a linear interpolation between the pair of (x, y) data sets in the array 176 having independent variable x values that are nearest to the received value of the independent variable x, and which are greater than and less than the received value of the independent variable x, respectively. Specifically, if $x_i \leq x \leq x_{i+1}$, $y_p$ may be calculated by performing a linear interpolation between the data points $(x_i, y_i)$ and $(x_{i+1}, y_{i+1})$, according to the formula:

$$y_p = \frac{y_{i+1} - y_i}{x_{i+1} - x_i}(x - x_i) + y_i \quad (1)$$

Once a predicted value $y_p$ has been calculated the diagnostic block 160 may calculate the difference between the actual value of the dependent variable y of the new (x, y) data set and the predicted value of the dependent variable $y_p$ according to the formula $\Delta y = y - y_p$. The diagnostic block 160 may then determine whether $\Delta y$ exceeds an established threshold value. If $\Delta y$ exceeds the threshold value the diagnostic block may detect an abnormal situation and generate the appropriate status signal 164.

FIGS. 6-9 illustrate the process of building a model of a monitored variable as a function of a corresponding load variable according to the algorithm shown in FIGS. 4 and 5. Each of FIGS. 6-9 show the contents of the array 176 as new data sets are received. The data sets stored in the array are also shown plotted on a coordinate system 180. The horizontal axis 182 represents load variable values and the vertical axis 184 represents monitored variable values.

Initially there are no data sets stored in the array 176. A first set of values $(x_a, y_a)$ is received from the SPM blocks 156, 158. The value $x_a$ is compared to the minimum and maximum values of the load variable $(x_{min}, x_{max})$ of the data sets stored in the array 176. Since there are initially no data sets stored in the array, no values for $x_{min}$ and $x_{max}$ have been established and the value $x_a$ cannot fall within the range $x_{min} \leq xa \leq max$. Therefore, the learning function 172 is implemented and the data set $(x_a, y_a)$ is added to the array 176. Since there are no other data sets stored in the array 176 at the time that the data set $(x_a, y_a)$ is added to the array, the dataset $(x_a, y_a)$ is added to the first position in the array and is accorded the index value 1. Thus, when the array 176 is plotted on the coordinate system 180, the point $(x_1, y_1)$ 186 corresponds to the values $(x_a, y_a)$ of the first data set received from the SPM blocks 156, 158.

A second set of load and monitored variable values $(x_b, y_b)$ is received from the SPM blocks 156, 158. Again the received value of the load variable $x_b$ is compared to the load variable values stored in the array 176. Since there is only one data set $(x_a, y_a)$ stored in the array 176 the received load variable value $x_b$ cannot fall within the range between $x_{min} \leq xa \leq max$ unless $x_b$ is exactly equal to $x_a$. Assume that $x_b > x_a$. The learning function 172 is implemented once again and the data set $(x_b, y_b)$ is added to the end of the array 176. Since the data set $(x_b, y_b)$ is the second data set stored in the array 176 it is accorded in the index value 2. When the array 176 is plotted on the coordinate system 180. The point $(x_2, y_2)$ 188 corresponds to the received load and monitored variable values $(x_b, y_b)$ received from the SPM blocks 156, 158. At this point, the model of the monitored variable comprises the line segment 190 extending between and including the data points $(x_i, y_i)$ 186 and $(x_2, y_2)$ 188.

Figure 7:
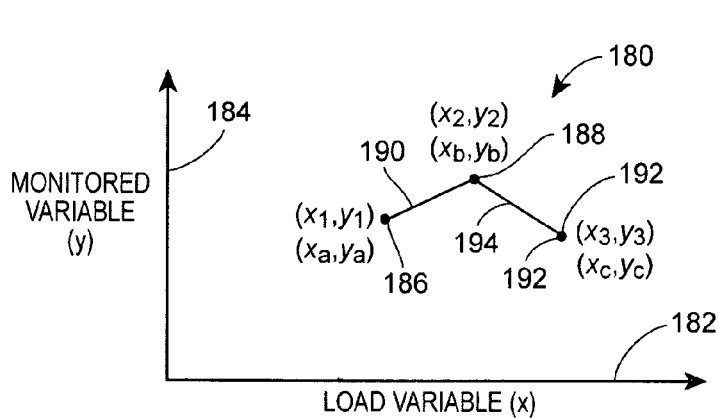
FIG. 7 is a table showing an array of data points and a corresponding plot of a function defined by the data points in the array when the array includes three data points.

Moving on to FIG. 7 a third data set comprising load and monitored variable values $(x_c, y_c)$ is received from the SPM blocks 156, 158. Assume $x_c > x_b$. At this point, $x_{min} = x_a$ (the lowest value of the monitored variable stored in the array 176) and $x_{max} = x_b$ (the highest value of the monitored variable store in the array 176). Since $x_c$ is greater than $x_b$, it does not fall within the range $x_{min} \leq xc \leq max$ and the learning function 172 is implemented yet again. The data set $(x_c, y_c)$ is added to the array 176. Since $x_c > x_{max}$ ($x_b$) the data set $(x_c, y_c)$ is added to the end of the array 176 and is accorded the index value 3. When the array 176 is plotted on the coordinate system 180 as shown in FIG. 7, the point $(x_3, y_3)$ 192 corresponds to the received load and monitored variable values $(x_c, y_c)$ received from the SPM blocks 156, 158. Now the model of the monitored variable comprises the linear segment 190 extending between and including the data points $(x_i, y_i)$ and $(x_2, y_2)$ and the linear segment 194 extending between and including the data points $(x_2, y_2)$ and $x_3, y_3)$.

Next consider a fourth data set $(x_d, y_d)$ received from the SPM blocks 156, 158. In this case assume that $x_b < x_d < x_c$. At this stage, the smallest value of the monitored variable store in the array 176 is $x_a$ and the largest value of the monitored variable stored in the array 176 is $x_c$. In other words $x_{min} = x_a$ and $x_{max} = x_c$. This time, the received value of the monitored variable $x_d$ is within the range $x_{min} < x_d < x_{max}$. Therefore, the monitoring function 174 is implemented with regard to the data set $(x_d, y_d)$ rather than the learning function 172. The data set $(x_d, y_d)$ is not added to the array 176.

In implementing the monitoring function 174 with regard to the data set $(x_d, y_d)$ the algorithm calculates a predicted value of the monitored variable $y_d$ based on the existing model and the received value of the load variable $x_d$. As mentioned above, we are assuming that the received value of the load variable $x_d$ falls within the range of $x_b < x_d < x_c$, since $x_d$ is between the values $x_b$ and $x_c$ the predicted value of the monitored variable may be calculated based on the portion of the model 180 represented by the linear segment 194 extending between and including $(x_2, y_2)$ 188 and $(x_3, y_3)$ 192 (i.e. $(x_b, y_b)$ and $(x_c, y_c)$). Recalling Eq. 1, the formula for calculating the predicted value of the monitored variable $y_p$ is $$y_p = \frac{y_3 - y_2}{x_3 - x_2} \cdot (x_d - x_2) + y_2$$

or $$y_p = \frac{y_c - y_b}{x_c - x_b} \cdot (x_d - x_b) + y_b.$$

In alternative embodiments the function modeling the monitored variable may be generated by methods other than performing a linear interpolation between the points in the array. For example, a spline may be generated for connecting the points in the array with a smooth curve. In a second order, or quadratic spline, a second order polynomial may be defined for connecting each pair of adjacent points. Curves may be selected in which the first derivatives of the curves are equal at the points where the curves meet (i.e. at the points defined in the array). In a third order or cubic spline, a third order polynomial may be defined for connecting each pair of adjacent points. In this case, adjacent curves having equal first and second derivatives at the points where the curves meet may be selected.

Once the predicted value of the monitored variable has been determined, the difference between the predicted value of the monitored variable $y_p$ and the received value of the monitored variable $y_d$ is compared to a threshold value. If $y_d - y_p$ is greater than the threshold value an abnormal situation is detected. If $y_d - y_p$ is not greater than the threshold, the process is operating within acceptable limits, and the monitoring of the monitored variable continues with the receipt of the next data set.

Figure 8:
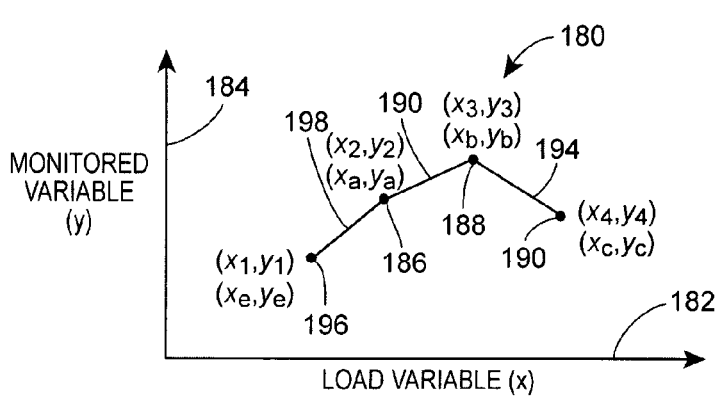
FIG. 8 is a table showing an array of data points and a corresponding plot of a function defined by the data points in the array when the array includes four data points.

Continuing with FIG. 8, a fifth data set $(x_e, y_e)$ is received from the SPM blocks 156, 158. In this case, assume that $x_e<x_a$. When the data set $(x_e, y_e)$ is received the smallest value of the load variable stored in the array 176 is $x_a$ and the largest value of the load variable stored in the array 176 is $x_c$. In other words, $x_{min}=x_a$ and $x_{max}=x_c$. In this case $x_e<x_a$, and the received value of the load variable $x_e$ is not within the range of load variable values already stored in the array 176. Accordingly, the learning function 172 is implemented with regard to the data set $(x_e, y_e)$, and the new data set is added to the array 178. However, this time, since $x_e<x_{min}(x_a)$ the new data set is added to the front of the array 176. The new data set $(x_e, y_e)$ is accorded the index value 1 and the index values accorded to each of the data sets already stored in the array 176 are incremented by 1. Thus when the array is plotted on the coordinate system 180 the point $(x_i, y_i)$ 196 corresponds to the data set $(x_e, y_e)$ the point $(x_2, y_2)$ 186 corresponds to the data set $(x_a, y_a)$, the point $(x_3, y_3)$ 188 corresponds to the data set $(x_b, y_b)$, and the point $(x_4, y_4)$ 192 correspond to the data set $(x_c, y_c)$. The model of the monitored variable now comprises the linear segment 198 extending between and including the data points $(x_1, y_1)$ 196 and $(x_2, y_2)$ 186, the linear segment 190 extending between and including the data points $(x_2, y_2)$ 186 and $(x_3, y_3)$ 188, and the linear segment 194 extending between and including the points $(x_3, y_3)$ 188 and $(x_4, y_4)$ 192.

Figure 9:
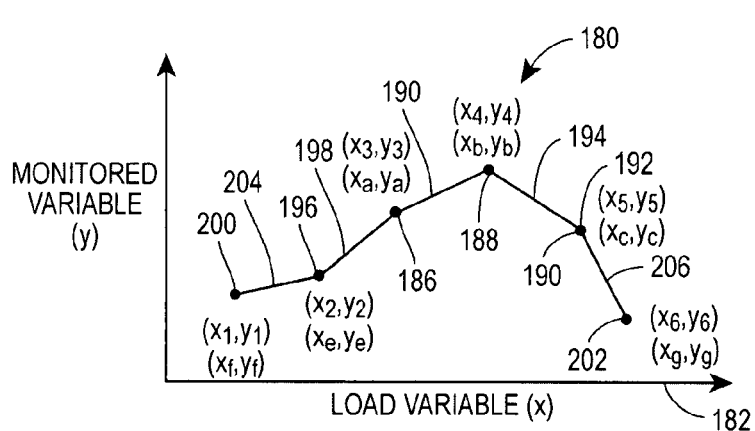
FIG. 9 is a table showing an array of data points and a corresponding plot of a function defined by the data points in the array when the array includes six data points.

FIG. 9 shows the addition of two more data points to the model. A data set $(x_f, y_f)$ is received from the SPM blocks 156, 158. $x_f$ is less than the smallest value of the load variable stored in the array 176 $(x_f<x_e)$. Accordingly the new data set $(x_f, y_f)$ is added to the front of the array 176, and is accorded the index value 1. The index values of all the other data sets stored in the array are incremented by 1. Next the data set $(x_g, y_g)$ is received from the SPM blocks 156, 158. In this case, $x_g$ is greater than the largest value of the load variable stored in the array 176 $(x_g>x_c)$. Accordingly, the new data set $(x_g, y_g)$ is added to the end of the array 176 and is accorded the next available index number, which in this case is the index value 6. The full array 176 is plotted on the coordinate system 180 in FIG. 9. The first point $(x_1, y_1)$ 200 corresponds to the data set $(x_f, y_f)$, the second point $(x_2, y_2)$ 196 corresponds to the data set $(x_e, y_e)$, the third point $(x_3, y_3)$ 186 corresponds to the data set $(x_a, y_a)$, the fourth point $(x_4, y_4)$ 188 corresponds to the data set $(x_b, y_b)$, the fifth point $(x_5, y_5)$ 190 corresponds to the data set $(x_c, y_c)$ and the sixth point $(x_6, y_6)$ 202 corresponds to the data set $(x_g, y_g)$. The model of the monitored variable comprises the linear segment 204 extending between and including data points $(x_1, y_1)$ 200 and $(x_2, y_2)$ 196, the linear segment 198 extending between and including points $(x_2, y_2)$ 196 and $(x_3, y_3)$ 186, the linear segment 190 extending between and including points $(x_3, y_3)$ 186 and $(x_4, y_4)$ 188, the linear segment 194 extending between and including points $(x_4, y_4)$ 188 and $(x_5, y_5)$ 192, and the linear segment 206 extending between and including data points $(x_5, y_5)$ 190 and $(x_6, y_6)$ 202.

In theory there is no limit to the number of points that may be added to the array 176 for creating an extensible model such as the extensible model developed in FIGS. 6-9. In practice, however, processing constraints may force an upper limit on the number of points that may be included in a particular model. In this case the question arises, which point in an established extensible model may be removed when a new point to be added to the model will exceed the upper processing limit on the number of points in the array without unduly changing the accuracy of the model? For example, suppose that the abnormal situation prevention algorithm that generated the extensible model of FIG. 9 has a processing limit of five points. Which of the data points 200, 196, 186, 188, 190 and 202, can be removed from the array 176 while having the least impact on the accuracy of the model?

Figure 10:
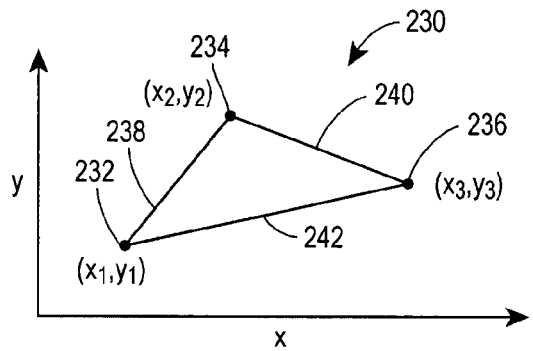
FIG. 10 is a plot illustrating a triangle formed by three adjacent data points and the amount of error created by removing a data point from an array modeling a monitored variable (y) as a function of a load variable (x).

Consider a sequence of three points $(x_1, y_1)$ 232, $(x_2, y_2)$ 234 and $(x_3, y_3)$ 236 shown in FIG. 10. The three points 232, 234, 236 define a triangle having sides defined by the line segments $(x_1, y_1)-(x_2, y_2)$ 238, $(x_2, y_2)-(x_3, y_3)$ 240, and $(x_1, y_1)-(x_3, y_3)$ 242. The line segments $(x_1, y_1)-(x_2, y_2)$ 238 and $(x_2, y_2)-(x_3, y_3)$ 240 form original portions of an extensible model in the range $[x_1, x_3]$. However, if the point $(x_2, y_2)$ 234 is removed from the model, the line segment $(x_i, y_i)-(x_3, y_3)$ 242 replaces the line segments $(x_1, y_1)-(x_2, y_2)$ 238 and $(x_2, y_2)-(x_3, y_3)$ 240. The amount of error between the original function containing all three points $(x_1, y_1)$ 232, $(x_2, y_2)$ 234, and $(x_3, y_3)$ 236 and the simplified function containing just the two points $(x_1, y_1)$ 232 and $(x_3, y_3)$ 236 is simply the area of the triangle 230 formed by all three points 232, 234, 236. The area of the triangle 230 may be calculated by the formula:

$$A = \frac{1}{2}|x_1 y_2 - x_1 y_3 - x_2 y_1 + x_2 y_3 + x_3 y_1 - x_3 y_2| \qquad (2)$$

If one must remove a point from an extensible model such as that shown in FIG. 9, the best point to remove is the one that will leave the modified extensible model as close to the original extensible model as possible. One way to determine this is to determine which point, when removed from the original extensible model, will result in the least amount of error between the original extensible model and the modified extensible regression model. The error introduced by removing any particular point may be determined by calculating the area of the triangle formed by the point itself and each adjacent point on either side of the point using the formula set forth in equation (2). This process may be carried out for every point in the original extensible model except for the two points at either end. The triangle having the smallest area will define the least amount of change between the original extensible model and the modified extensible model. Thus, the point that forms the smallest triangle along with its two adjacent neighbors is the best candidate to be removed from the extensible model when processing constraints require that a point must be removed from the model in order to improve processing efficiency, or otherwise meet the processing limitations of the hardware device or systems implementing the abnormal situation prevention algorithm.

Figure 11:
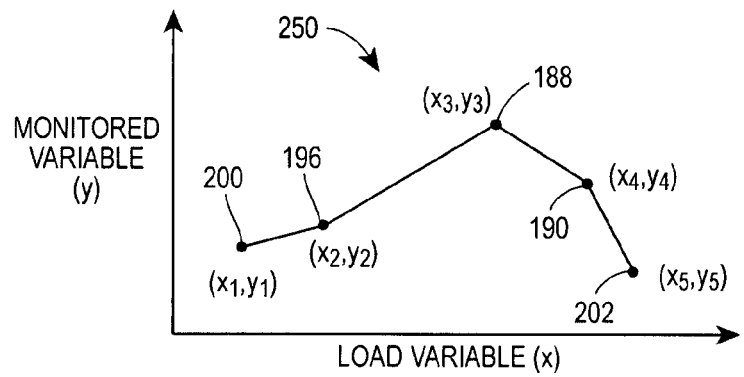
FIG. 11 is a plot of the function modeling a monitored variable (y) as a function of a load variable (x) shown in FIG. 9 with one of the data points removed.

Returning to the extensible model shown in FIG. 9, it can be seen that the point $(x_3, y_3)$ 186 is nearly co-linear with the two adjacent points $(x_2, y_2)$ 196 and $(x_4, y_4)$ 188. Clearly, the area of the triangle formed by these three points 196, 186, 188 will be quite small. Removing the point $(x_3, y_3)$ 186 will have a very negligible effect on the overall shape of the extensible regression model 210, as can be verified by comparing the extensible model of FIG. 9 with the modified extensible model 250 shown in FIG. 11. The point $(x_3, y_3)$ 186 in the original extensible model of FIG. 9 has been removed from the modified extensible model 250 of FIG. 11. Even without the point $(x_3, y_3)$ 186, the modified extensible model 250 of FIG. 11 has substantially the same shape as the original extensible model of FIG. 9. (It should be noted that the index values of the points defining the modified extensible model 250 of FIG. 11 have been adjusted to reflect the removal of point $(x_3, y_3)$ 186 from the original extensible model of FIG. 9. The reference numbers identifying the points, however, have been left unchanged. Thus, points $(x_1, y_1)$ 200 and $(x_2, y_2)$ 196 in the modified extensible model 250 correspond to the same points $(x_1, y_1)$ 200 and $(x_2, y_2)$ 196 in the original extensible model of FIG. 9. Point $(x_3, y_3)$ 188 in the modified extensible model 250 of FIG. 11, however, corresponds to point ($x_4$, $y_4$) 188 in the original extensible model of FIG. 9. Point ($x_4$ $y_4$) 190 of the modified extensible model 250 of FIG. 11 corresponds to the point ($x_5$, $y_5$) 190 in the original extensible model of FIG. 9, and the point ($x_5$, $y_5$) 202 in the modified model 250 of FIG. 11 corresponds to the point ($x_6$, $y_6$) 202 in the original extensible model of FIG. 9.)

Figure 12:
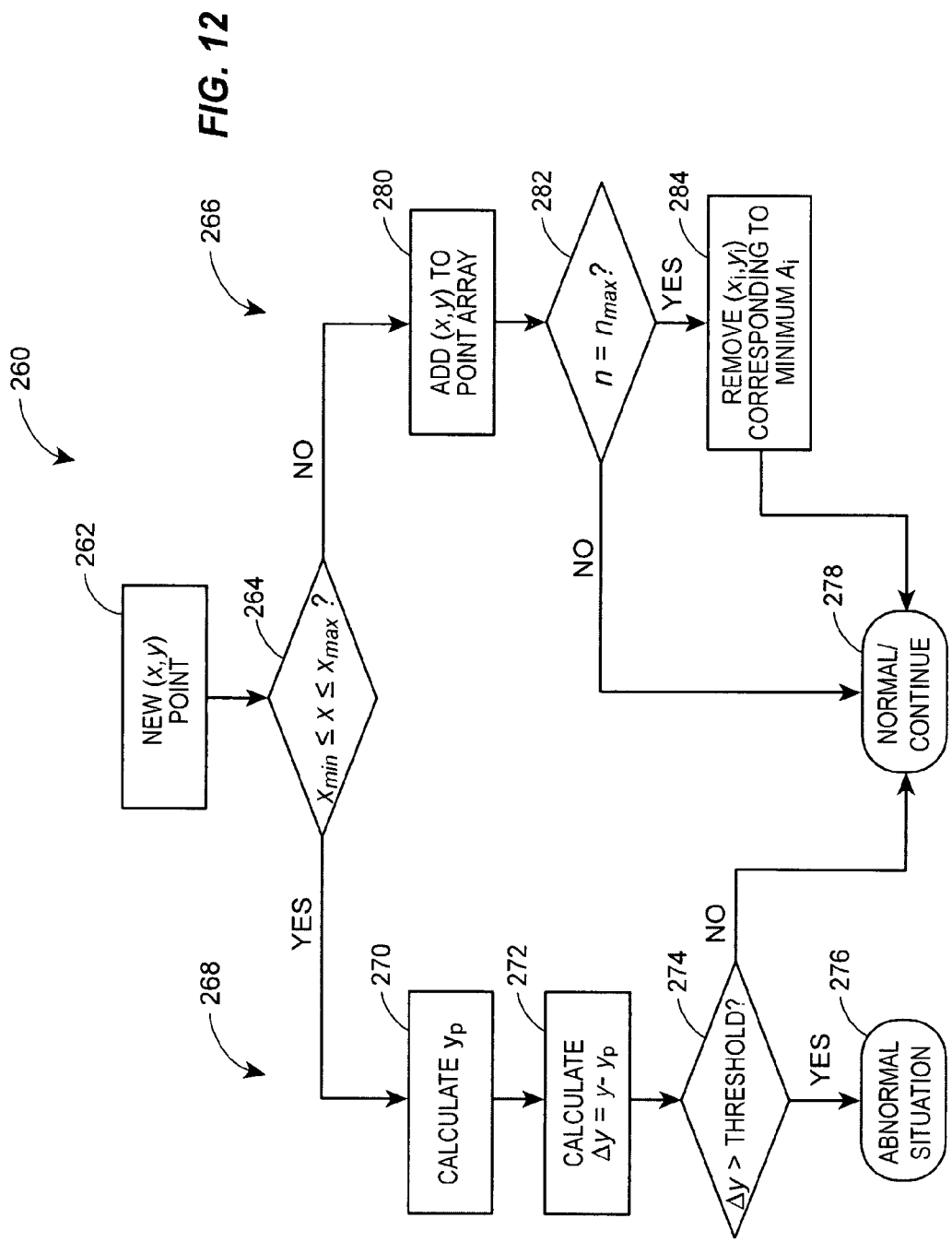
FIG. 12 is a flow chart of a method of modeling a monitored variable as a function of a load variable and detecting an abnormal condition.

Turning now to FIG. 12, a method 260 is shown for implementing an abnormal situation prevention system. According to the method, a new point (x, y) is received at 262. The independent variable x of the new point (x, y) may comprise a statistical signature (e.g., the mean, the standard deviation, or other statistical measure) of a first process variable over a predefined sample window. The dependent variable y of the new point (x, y) may comprise a statistical signature of a second process variable. The abnormal situation prevention system may monitor the second variable (the monitored variable) as a function of the first variable (the load variable). The abnormal situation prevention system may detect an abnormal situation when the monitored variable does not behave in a predicted manner based on the behavior of the load variable. The value of the independent variable x is examined in decision block 264. The value of the independent variable x for the new point (x, y) is compared to the independent variable values of previously received points. If the value of the independent variable x for the received point is within the range of values for the independent variable x from previously received points, i.e., if $x_{min} \leq x \leq x_{max}$ where $x_{min}$ is the lowest value of x that has been received and $x_{max}$ is the highest value of x that has been received, then the monitoring function 268 is executed. If the received value of x is not within the range between $x_{min}$ and $x_{max}$, then the learning function 266 is performed.

If the value of x for the new point is not within the range of values that have already been received, the new point is added to the array of points defining an extensible model at 280. If the value of x is less than $x_{min}$ the new point is added to the front of the array and the index values of the other points already stored in the array are incremented by 1. If the value of x is greater than $x_{max}$, then the new point is added at the end of the array. At decision block 282, the number of points stored in the array is evaluated to determine whether the number of points already stored in the array is equal to the maximum number of points that may be stored in the array. If $n \neq n_{max}$, the abnormal situation prevention system continues at 278. However, if $n = n_{max}$, a point is removed from the array at 264. The point removed may be a point ($x_i$, $y_i$) forming a triangle with its neighboring points having the smallest area $A_i$, as described above. Alternatively, an integral square error algorithm may be employed for identifying a point that when removed from the array, will result in the least amount of error introduced into the corresponding extensible model.

Returning to decision block 264, if the value of the independent variable x is within the range of variable values already received, the monitoring function 268 proceeds by calculating a predicted value of the dependent variable $y_p$ at 270. The predicted value of the dependent variable is calculated based on the received value of the independent variable x and the extensible model embodied in the points stored in the array. Once the predicted value of the dependent variable $y_p$ has been calculated, the difference value $\Delta y$ is calculated by subtracting the predicted value of the dependent variable $y_p$ from the actual value of y in the new data point received at 272. The value $\Delta y$ is then compared to a user defined threshold at 274. If $\Delta y$ is greater than the threshold, an abnormal situation is detected at 276. If the value of $\Delta y$ is not greater than the threshold at 274, the status of the monitored process is considered normal and the abnormal situation prevention algorithm continues at 278.

Figure 13:
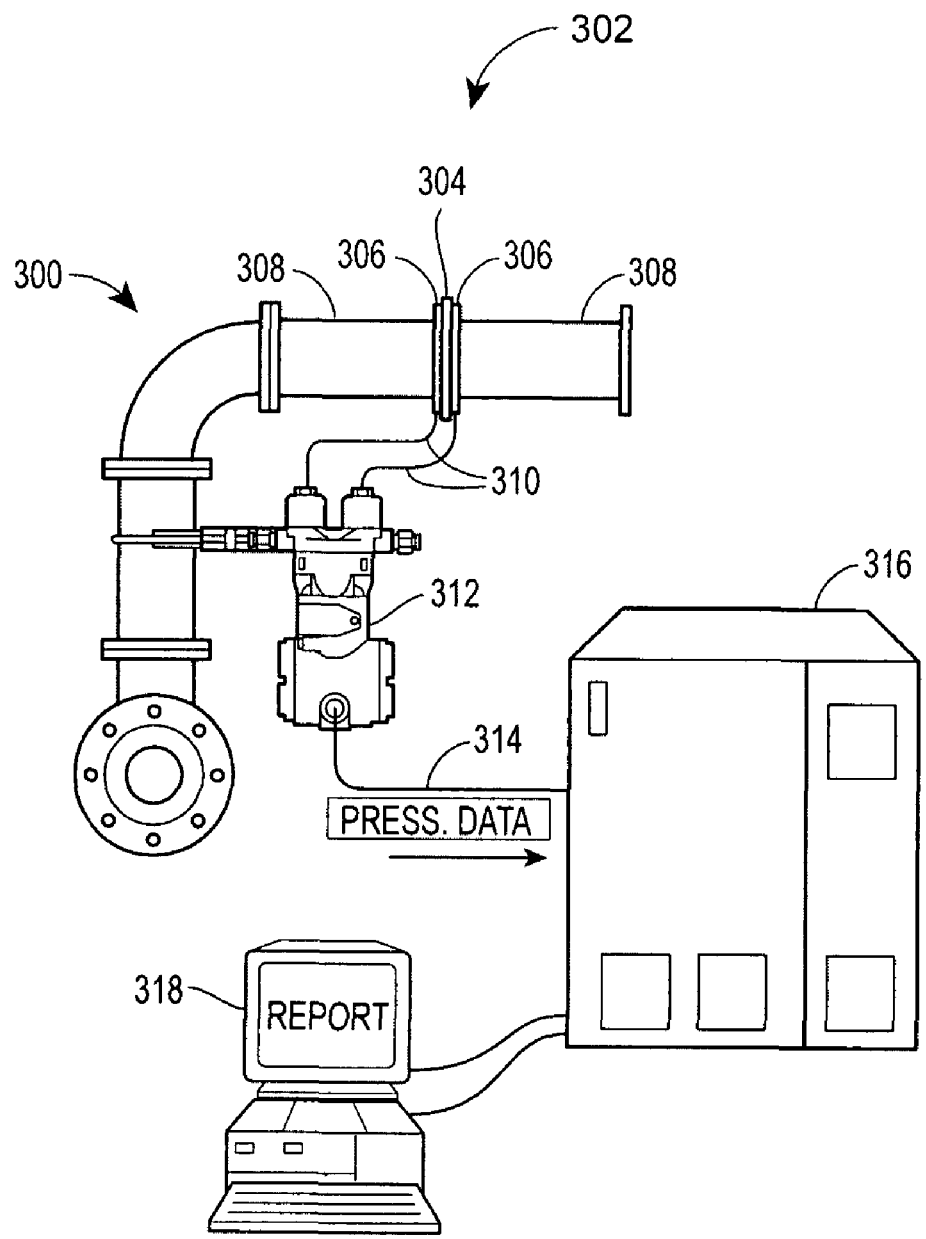
FIG. 13 shows a differential pressure flow measuring device installed in a piping system in a process plant.

The abnormal situation and prevention algorithms described above may be employed, for example, to detect a plugged impulse line in a process measuring device such as a pressure sensor, a differential pressure flow rate detector, or the like. A plugged line diagnostic system is discussed in U.S. Pat. No. 6,907,383 issued to Eryurek et al. (Eryurek) on Jun. 14, 2005 and assigned to Rosemount, Inc. of Eden Prairie, Minn., the entire disclosure of which is incorporated herein by reference. A portion of the plugged line diagnostic system disclosed by Eryurek is reproduced in FIG. 13 of the present disclosure. The portion of the plugged line diagnostic system shown in FIG. 13 includes a "pressure generator" 302 installed in a fluid piping system 300. The "pressure generator" 302 includes a primary element 304 installed in the fluid piping system 300 in a manner that causes a pressure drop in the fluid across the primary element. Impulse lines or passageways 310 couple the pressure drop across the primary element to a location outside the fluid piping system 300. The primary element 304 may comprise an orifice plate, a pilot tube, a nozzle, a venturi; a shedding bar, a bend in the pipe, or any other discontinuity adapted to cause a pressure drop in the flow of fluid through the piping system. In the example shown in FIG. 13, the pressure generator comprises an orifice plate 304 clamped between pipe flanges 306 formed at the ends of two adjoining sections of pipe 308 in the fluid piping system 300.

The impulse lines 310 carry the differential pressure across the primary element 304 to a pressure transmitter 312. The pressure transmitter 312 may be a smart field device implementing one or more function blocks for calculating the flow rate through the fluid piping system 300 based on the differential pressure across the primary element 304 or other characteristics of the process of which the fluid piping system is a part. The pressure transmitter 312 may transmit pressure data and other data to control system 316 over a communication line 314. The pressure data and/or other data may be transmitted via a standard industry format using a digital protocol such as the Hart Protocol, FOUNDATION fieldbus, profibus, or the like.

The pressure transmitter 312 may further implement an abnormal situation prevention block for diagnosing a plugged line condition in one or both of the impulse lines 310. The plugged line detection system disclosed by Eryurek calculates the standard deviation of a high frequency component of the differential pressure signal over a specified time interval (such as one or two minutes). If the impulse lines 310 become plugged, a constant pressure becomes trapped in the impulse lines and the standard deviation of the differential pressure readings will drop. If the standard deviation decreases from its initial value by more than a specified amount, (e.g., 60%, 70% or 80%) the abnormal situation prevention block detects a plugged line and transmits an appropriate alarm message to the controller 316. Also, if the standard deviation increases by more than a specified amount, this may indicate that only one impulse line is plugged. Additional checks may also be provided in order to ensure that diagnostic readings are valid. For example, there may be a check to determine steady state conditions. If, during the course of operation, the process changes to a different flow rate, the plugged line diagnostics may be restarted since the standard deviation of the differential pressure across the primary element may be dependent on the flow rate.

Because the plugged line diagnostics must be restarted whenever the flow rate changes by more than a predefined amount, the plugged line detection system of Eryurek is well suited only for applications having relatively constant flow-rates, it does not work well, however, in processes in which the flow rate may be constantly changing.

A solution to this problem is to model the high pass filtered standard deviation of the pressure signal as a function of the mean. The model may comprise a linear regression or any other regression technique. Once the regression model has been developed, a value of the standard deviation of the pressure signal may be predicted from the mean value of the pressure signal. The predicted value of the standard deviation may then be compared to the actual value. If the predicted value differs from the actual value by more than a predetermined amount, a plugged line condition may be detected.

Figure 14:
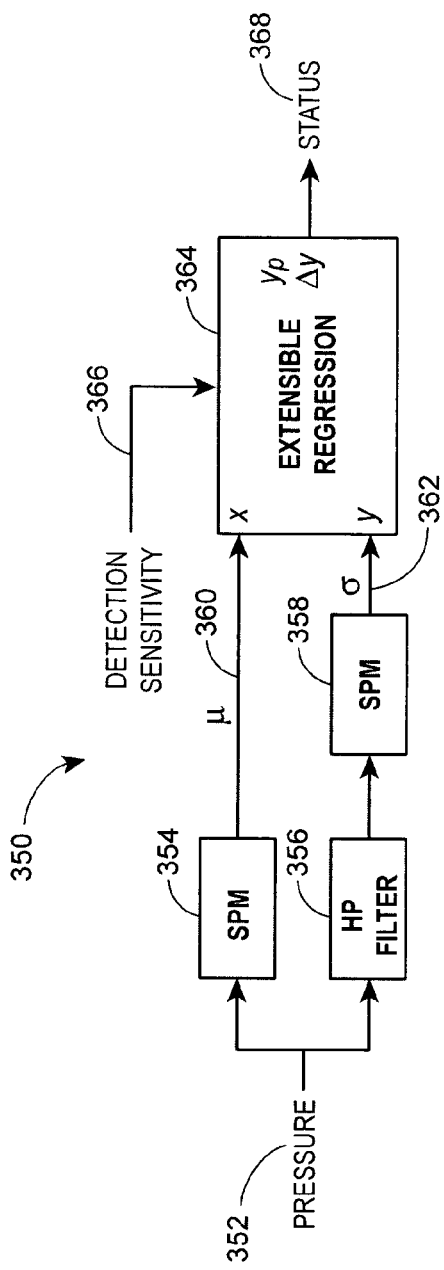
FIG. 14 is a block diagram of an embodiment of a plugged line detection system.

A first algorithm 350 for modeling the standard deviation of the differential pressure signal as a function of the mean value of the pressure signal in a plugged impulse line detection system is shown in FIG. 14. The algorithm 350 is based on the extensible regression algorithm described above with regard to FIG. 3. The differential pressure signal 352 measured across the two impulse lines of a pressure generator installed in a fluid piping system is input to a first SPM block 354, and a high pass filter 356. The first SPM block calculates the mean of a plurality of pressure samples taken over a predefined sample window, or after a predefined number of samples has been collected. The mean value µ 360 calculated by the first SPM block is input as the independent variable x to the extensible regression block 364. As mentioned, the differential pressure signal 352 is also input to a highpass filter 356. The high pass filter 356 removes the low frequency components of the differential pressure signal, and passes the high frequency components on to a second SPM block 358. The second SPM block 358 calculates the standard deviation of the high frequency components of the differential pressure signal. The standard deviation a 362 calculated by the second SPM block 358 is input as the dependent variable y to the extensible regression block 364. As has been described, the extensible regression block 364 calculates a predicted value of the dependent variable y (in other words, the predicted standard deviation of the high frequency components of the differential pressure signal 352) based on the received value of the independent variable x (the mean value of the differential pressure signal 352) according to the extensible regression model developed during a modeling, or learning phase. The predicted value of the standard deviation of the differential pressure signal $y_p$ may be compared to the actual value of the standard deviation of the differential pressure y. The difference y may then be compared to a threshold value to determine whether one or both of the impulse lines are plugged. A status output signal 368 may provide an indication to an external controller or other monitoring equipment whether the plugged impulse line has been detected.

To implement plugged line detection using the extensible regression algorithm as shown in FIG. 14, one must specify a statistical calculation period. This may comprise, for example, a 1-3 minute window for gathering a sufficient number of samples to calculate meaningful statistics regarding the differential pressure signal. Alternatively, rather than establishing a set time window, a set number of samples may be defined, such that the statistical calculations performed by the SPM blocks 354, 358 may be performed on a fixed number of samples. One must also specify the length of the learning period for developing the extensible regression model. The learning period should be several times longer than the statistical calculation period.

The plugged line detection algorithm 350 includes a detection sensitivity input 366. The detection sensitivity input may be used to adjust the threshold at which the extensible regression block 364 detects a plugged line. For example, a plugged line detection algorithm may be provided with three sensitivity levels. A high level of sensitivity may detect a plugged line when the difference between the actual standard deviation of the differential pressure signal y and the predicted value of the standard deviation of the differential pressure signal $y_p$ is greater than 60% of the predicted value. Similarly, a medium sensitivity may detect a plugged line when the difference between the actual standard deviation of the differential pressure signal and the predicted value of the standard deviation of the differential pressure signal exceeds 70% of the predicted value. Finally, a low sensitivity level may detect a plugged line only when the difference between the actual standard deviation of the differential pressure signal y and the predicted standard deviation of the pressure signal $y_p$ exceeds 80% of the predicted value. A status output 368 may provide an indication to an external controller or other monitoring device whether a plugged impulse line has been detected.

The steps for determining whether both impulse lines are plugged may be succinctly described as:

calculate $y_p$ $$\text{calculate } \Delta y\% \left(\Delta y\% = \frac{y - y_p}{y_p} \cdot 100\right)$$

If $\Delta y<0$ and $|\Delta y\%|>$threshold, a plugged line is detected. A similar algorithm can be used for detecting a single impulse line plugged condition. In that case, the standard deviation of the pressure signal would be greater than expected by more than a threshold amount.

Figure 15:
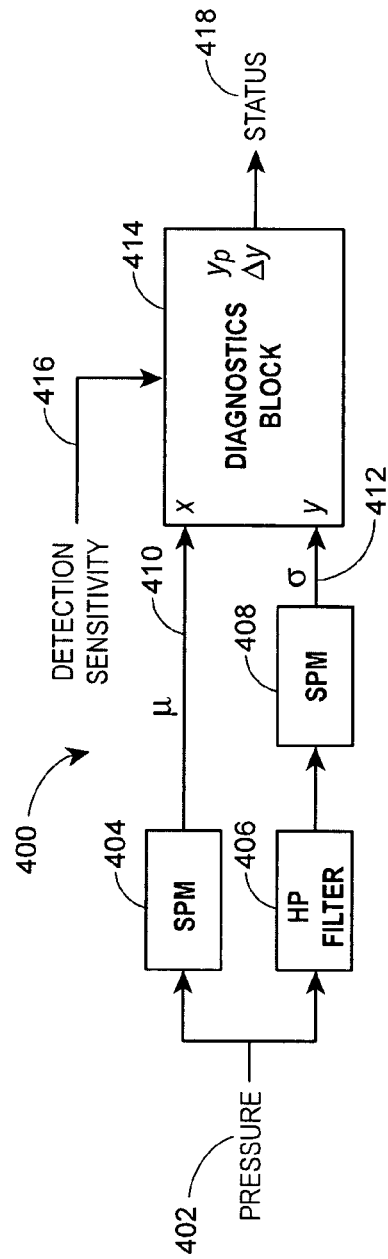
FIG. 15 is a block diagram of another embodiment of a plugged line detection system.

A second algorithm 400 for modeling the standard deviation of a differential pressure signal as a function of the mean value of the pressure signal in a plugged line detection system is shown in FIG. 15. Like the first algorithm 350 in FIG. 14, a differential pressure signal 402 is input to a first SPM block 404. The first SPM block calculates the mean value of the pressure signal over a predefined sample window or a designated number of samples. The mean µ 410 of the differential pressure signal is then input to a diagnostic block 414 as the independent variable x. The differential pressure signal 402 is also input to a high pass filter 406 that removes the low frequency components of the differential pressure signal 402. The filtered differential pressure signal is then input to a second SPM block 408. The second SPM block 408 calculates the standard deviation at a 412 of the filtered differential pressure signal over the same predefined sample window or number of samples as used by the first SPM block 404. The standard deviation car 412 of the filtered differential pressure signal is input to the diagnostic block 414 as the dependent variable y. The diagnostic block 414 implements both a learning function and a monitoring function as described above with regard to FIG. 5. The learning function generates a piecewise linear model (or a model based on some other method of interpolating points, such as a quadratic or cubic spline) that may be employed by the monitoring function to predict the standard deviation values of the filtered differential pressure signal. Like the algorithm 350 shown in FIG. 14, the diagnostic block 414 calculates the difference between predicted values of the standard deviation of the filtered differential pressure signal, and the actual values. If the difference exceeds a predefined threshold then a plugged impulse line is detected. Again, a detection sensitivity input 416 may be used to establish the sensitivity threshold at which a plugged line is detected. The sensitivity may be set in the same manner as described above. A status output 418 may provide an indication to an external controller or other monitoring device whether a plugged impulse line has been detected.

The present invention has been described with reference to specific examples. These examples are intended to be illustrative only and should not be read as limiting the invention in any way. It will be apparent to those of ordinary skill in the art that changes, additions or deletions may be made to the disclosed embodiments without departing from the spirit and scope of the invention.

What is claimed is:

1. A system for detecting a plugged impulse line in a process measuring device, the system comprising:
   a sensor for detecting a pressure in a process line, the sensor providing a pressure signal indicative of the pressure; and
   one or more processors implementing a first statistical process monitoring (SPM) block, a second SPM block, and a plugged line diagnostic block;
   the first SPM block configured to calculate mean values from a plurality of pressure signal sample values collected during predefined sample windows, and the second SPM block configured to calculate standard deviation values from a plurality of pressure signal sample values collected during the predefined sample windows; and
   the plugged line diagnostic block configured to mathematically model the standard deviation values as a function of corresponding calculated mean values, to predict standard deviation values based on the calculated mean values, compare predicted standard deviation values to corresponding calculated standard deviation values, and detect a plugged impulse line when a predicted standard deviation value differs from a corresponding calculated standard deviation value by more than a predefined amount.

2. The system of claim 1 further comprising a filter adapted to remove frequency components from the pressure signal to provide a filtered pressure signal, wherein the second SPM block is configured to calculate standard deviation values from a plurality of filtered pressure signal sample values.

3. The system of claim 1 wherein the diagnostic block comprises an extensible regression model.

4. The system of claim 1 wherein the plugged line diagnostic block comprises an array of data points, each data point defined by a pair of corresponding pressure signal mean and pressure signal standard deviation values, the array of data points defining a function that models the pressure signal standard deviation values as a function of the pressure signal mean values.

5. The system of claim 4 wherein the plugged line diagnostic block further comprises a learning function in which new data points are added to the array, and a monitoring function in which a predicted value of the pressure signal standard deviation is determined based on the pressure signal mean value of a new data point and the predicted value of the standard deviation of the pressure signal is compared to the actual standard deviation of the pressure signal value of the new data point.

6. The system of claim 5 wherein the learning function is executed when the pressure signal mean value of the new data point is less than or greater than the pressure signal mean value of all data points in the array.

7. The system of claim 5 wherein the array is limited to a fixed number of points and wherein the learning function further comprises removing a point from the array when a new point is added.

8. The system of claim 7 wherein the point removed from the array comprises a point which, when removed from the array, will result in a least amount of error between the function defined by the array including the point and a function defined by the array having the point removed.

9. The system of claim 8 wherein the error between the function defined by the array including the point, and the function defined by the array with the point removed from the array comprises the area of a triangle defined by the point and two other points in the array immediately adjacent to the point.

10. The system of claim 8 wherein calculating the error between the function defined by the array including the point, and the function defined by the array with the point removed from the array comprises calculating an integral square error between the two functions.

11. The system of claim 1 wherein the diagnostic block includes a configurable sensitivity level such that a plugged impulse line will be detected when the predicted standard deviation of the pressure signal value differs from the corresponding calculated standard deviation value of the pressure signal by an amount determined by a configured sensitivity level.

12. The system of claim 11, wherein the configurable sensitivity level includes a high sensitivity setting such that a plugged impulse line is detected when the predicted standard deviation value differs from the calculated standard deviation value by 60% or more.

13. The system of claim 11, wherein the configurable sensitivity level includes a medium sensitivity setting such that a plugged impulse line is detected when the predicted standard deviation value differs from the calculated standard deviation value by 70% or more.

14. The system of claim 11, wherein the configurable sensitivity level includes a low sensitivity setting such that a plugged impulse line is detected when the predicted standard deviation value differs from the calculated standard deviation value by 80% or more.

15. The system of claim 1 wherein at least one of the one or more processors is implemented in at least one of: a process control field device; a field device interface module; a handheld communicator; or a process controller.

16. The system of claim 1 wherein at least one of the first SPM block, the second SPM block, and the diagnostic block is implemented as a stand alone software application.

17. The system of claim 1 wherein at least one of the first SPM block, the second SPM block, and the diagnostic block is implemented as part of an abnormal situation prevention system.

* * * * *

UNITED STATES PATENT AND TRADEMARK OFFICE
CERTIFICATE OF CORRECTION

PATENT NO. : 8,055,479 B2  
APPLICATION NO. : 11/973960  
DATED : November 8, 2011  
INVENTOR(S) : John P. Miller Page 1 of 1

It is certified that error appears in the above-identified patent and that said Letters Patent is hereby corrected as shown below:

In the Claims:

At Column 24, line 54, Claim 16, "stand alone" should be -- standalone --.

Signed and Sealed this  
Second Day of July, 2013

Teresa Stanek Rea  
*Acting Director of the United States Patent and Trademark Office*